US008562708B2

(12) United States Patent
Platt

(10) Patent No.: US 8,562,708 B2
(45) Date of Patent: Oct. 22, 2013

(54) THREE-DIMENSIONAL FILTER

(75) Inventor: Keith Platt, Snellville, GA (US)

(73) Assignee: Diversitech Corporation, Duluth, GA (US)

( * ) Notice: Subject to any disclaimer, the term of this patent is extended or adjusted under 35 U.S.C. 154(b) by 35 days.

(21) Appl. No.: 13/098,091

(22) Filed: Apr. 29, 2011

(65) Prior Publication Data

US 2011/0265436 A1 Nov. 3, 2011

Related U.S. Application Data

(60) Provisional application No. 61/329,808, filed on Apr. 30, 2010.

(51) Int. Cl.
*B01D 46/10* (2006.01)

(52) U.S. Cl.
USPC .................................. 55/497; 55/501; 55/521

(58) Field of Classification Search
USPC ........... 55/378, 379, 492, 495, 501, 511, 521, 55/DIG. 31; 210/479, 493.1, 493.5, 497.01
See application file for complete search history.

(56) References Cited

U.S. PATENT DOCUMENTS

| 3,392,846 | A | 7/1968 | Getzin |
| 3,950,157 | A | 4/1976 | Matney |
| 4,015,751 | A | 4/1977 | Rollins et al. |
| 4,129,430 | A | 12/1978 | Snow |
| 4,980,936 | A | 1/1991 | Frickland et al. |
| 5,098,767 | A | 3/1992 | Linnersten |
| 5,167,740 | A | 12/1992 | Michaelis et al. |
| 5,215,609 | A | 6/1993 | Sanders |
| 5,376,270 | A | 12/1994 | Spearman |
| 5,505,603 | A | 4/1996 | Baracchi et al. |
| 5,505,852 | A * | 4/1996 | van Rossen ................ 210/493.3 |
| 5,512,172 | A | 4/1996 | Marble |
| 5,531,892 | A * | 7/1996 | Duffy ........................ 210/493.1 |
| 5,810,898 | A | 9/1998 | Miller |
| D414,855 | S | 10/1999 | Reuter |
| 6,165,242 | A | 12/2000 | Choi |
| 6,319,300 | B1 * | 11/2001 | Chen .............................. 55/497 |
| 6,336,946 | B1 | 1/2002 | Adams et al. |

(Continued)

FOREIGN PATENT DOCUMENTS

| JP | 355139811 A | 11/1980 |
| JP | 63-268606 | 11/1988 |

OTHER PUBLICATIONS

PCT International Search Report issued by the U.S. Patent & Trademark Office as International Search Authority on Jul. 11, 2011.

*Primary Examiner* — Duane Smith
*Assistant Examiner* — Minh-Chau Pham
(74) *Attorney, Agent, or Firm* — Smith Gambrell & Russell LLP

(57) ABSTRACT

A three-dimensional filter includes a filter frame having a three-dimensional skeletal structure with a filter media connected to the skeletal structure. The filters are nestable. The skeletal structure may be trimmed and provided with walls to create standard sized filters. Methods for making the three-dimensional filter include injection molding of the skeletal structure onto the filter media, injection molding the filter media and the filter frame together in a single molding process, thermoforming a molded or extruded skeletal structure and the filter media, and needle punching a molded or extruded skeletal structure to create filter media within the skeletal structure.

19 Claims, 35 Drawing Sheets

(56) References Cited

U.S. PATENT DOCUMENTS

| | | |
|---|---|---|
| 6,375,699 B1 | 4/2002 | Beck |
| 6,416,570 B2 | 7/2002 | Goto et al. |
| 6,507,717 B2 | 1/2003 | Kushida |
| 6,599,343 B2 | 7/2003 | Fredrick et al. |
| 6,652,613 B2 | 11/2003 | Shah et al. |
| D483,103 S | 12/2003 | Dalzell |
| 6,740,136 B2* | 5/2004 | Duffy .............. 55/497 |
| 6,843,820 B2 | 1/2005 | Kubokawa |
| 7,442,221 B2 | 10/2008 | Ruhland et al. |
| 7,537,632 B2 | 5/2009 | Miller et al. |
| 7,582,131 B2* | 9/2009 | Worthington et al. ......... 55/501 |
| 7,691,165 B1 | 4/2010 | Hammes |
| 7,901,476 B2* | 3/2011 | Kao .............. 55/379 |
| 7,931,726 B2* | 4/2011 | Karlsson et al. ............ 55/521 |
| 8,105,425 B2* | 1/2012 | Ptak et al. ............ 96/17 |
| 8,197,571 B2* | 6/2012 | Porter ............ 55/499 |
| 2001/0032545 A1 | 10/2001 | Goto et al. |
| 2002/0083692 A1* | 7/2002 | Richerson et al. ............ 55/521 |
| 2002/0089084 A1 | 7/2002 | Kandel |
| 2003/0230061 A1* | 12/2003 | Kubokawa et al. ............ 55/486 |
| 2005/0138906 A1 | 6/2005 | Kubokawa et al. |
| 2005/0150201 A1* | 7/2005 | Choi et al. ............ 55/499 |
| 2006/0249443 A1 | 11/2006 | Chilton et al. |
| 2007/0006560 A1 | 1/2007 | Ruhland et al. |
| 2007/0107393 A1* | 5/2007 | Worthington et al. ......... 55/501 |
| 2007/0271887 A1 | 11/2007 | Osborne et al. |
| 2007/0289274 A1 | 12/2007 | Justice et al. |
| 2008/0203614 A1 | 8/2008 | Holzmann et al. |
| 2008/0276805 A1 | 11/2008 | Lotgerink-Bruinenberg |
| 2009/0126326 A1 | 5/2009 | McClellan |
| 2010/0326028 A1* | 12/2010 | Sundet ............ 55/499 |
| 2012/0117931 A1* | 5/2012 | Anoszko et al. ............ 55/499 |
| 2012/0223009 A1* | 9/2012 | Mbadinga-Mouanda et al. ............ 210/493.5 |

* cited by examiner

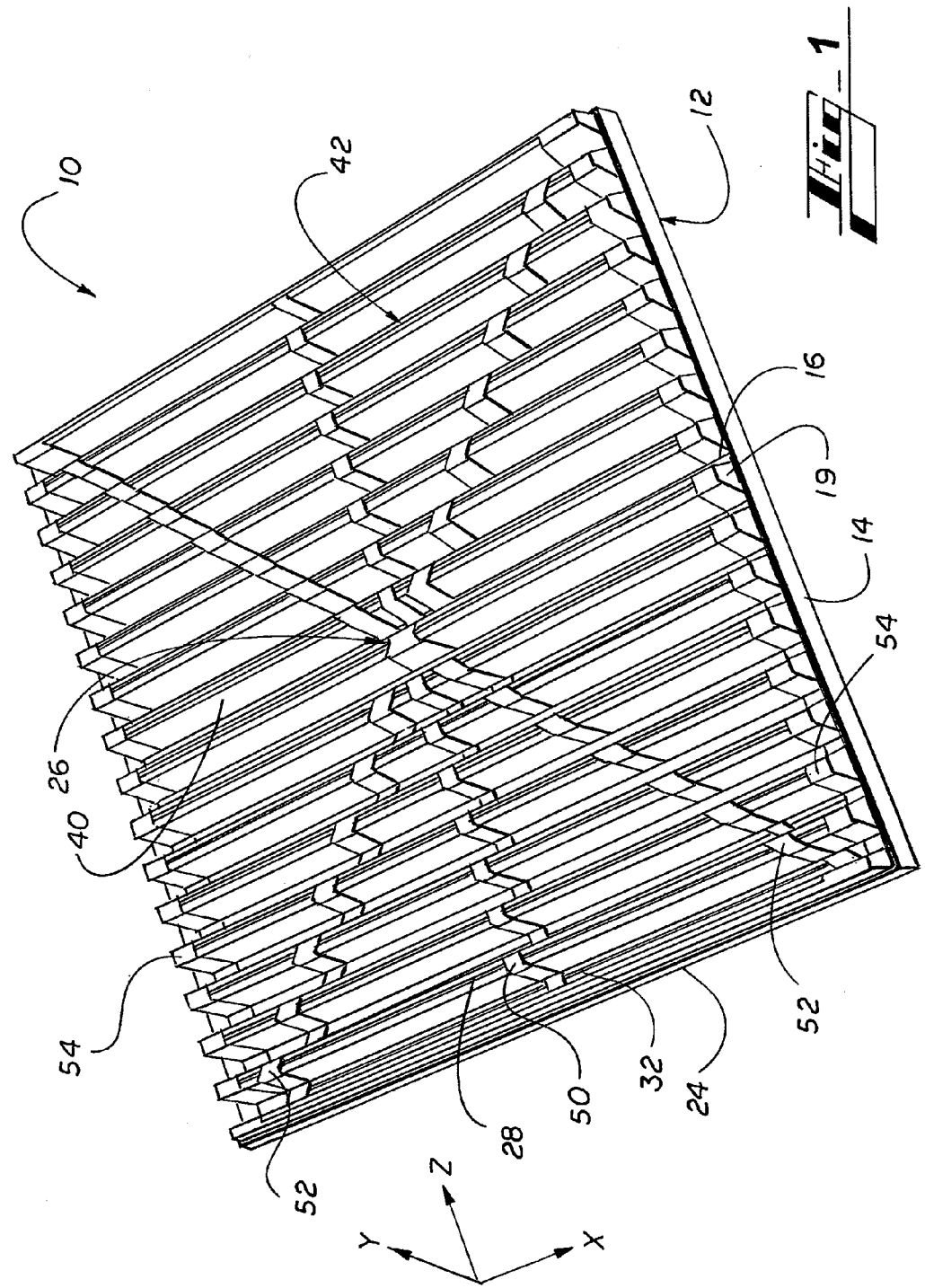

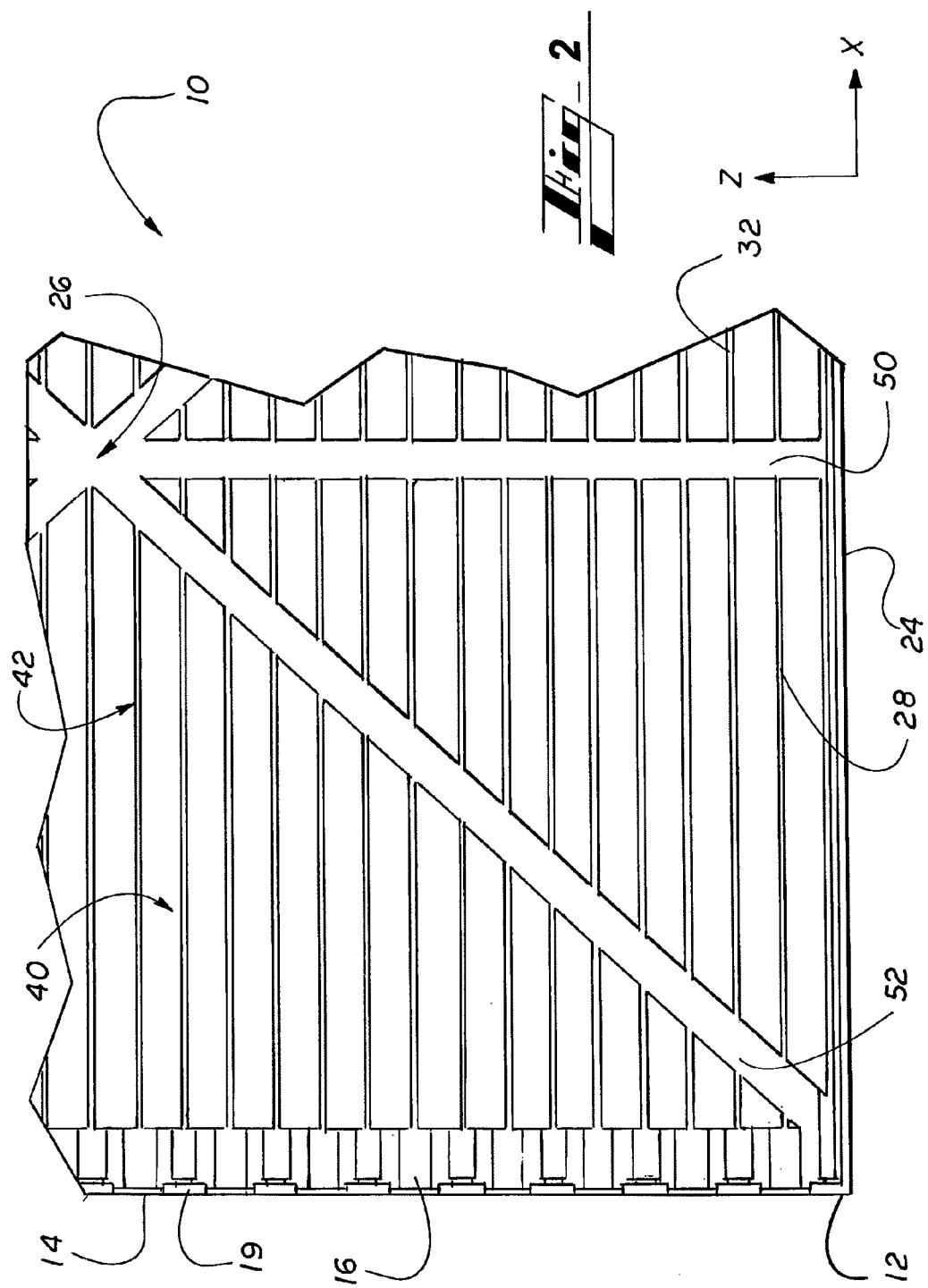

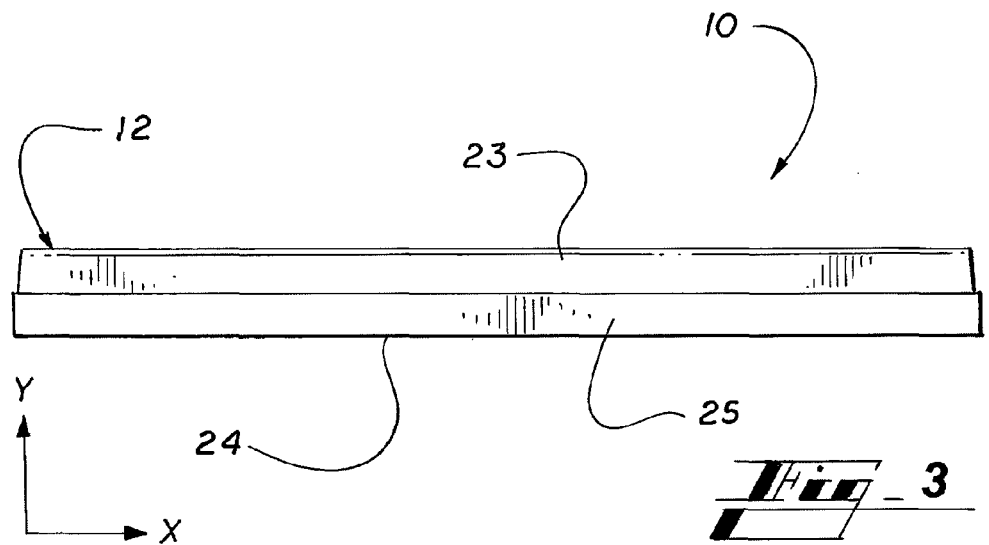
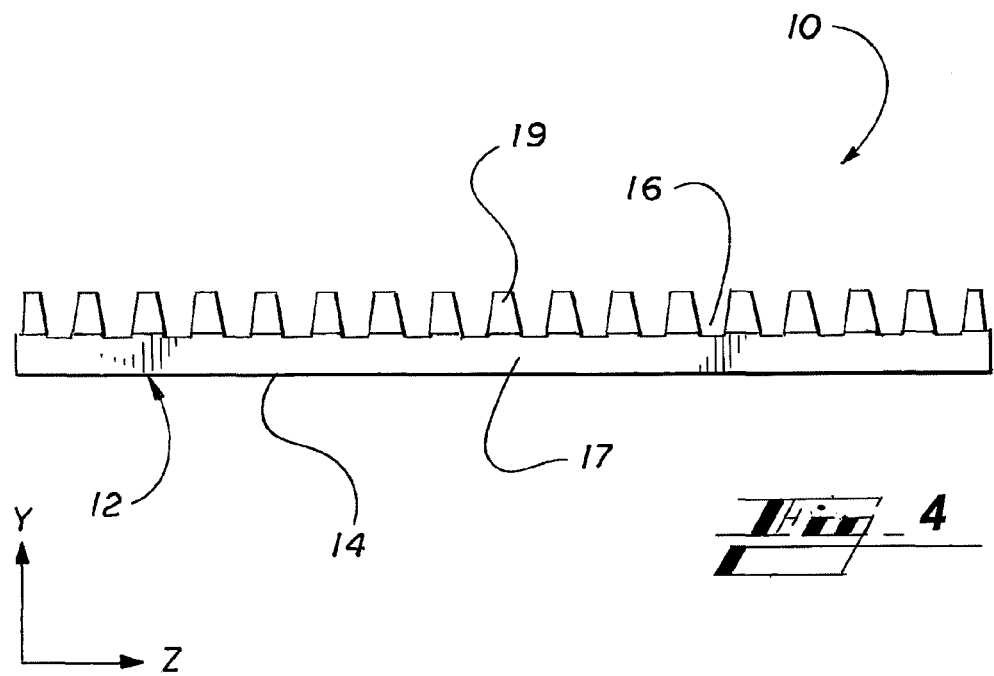

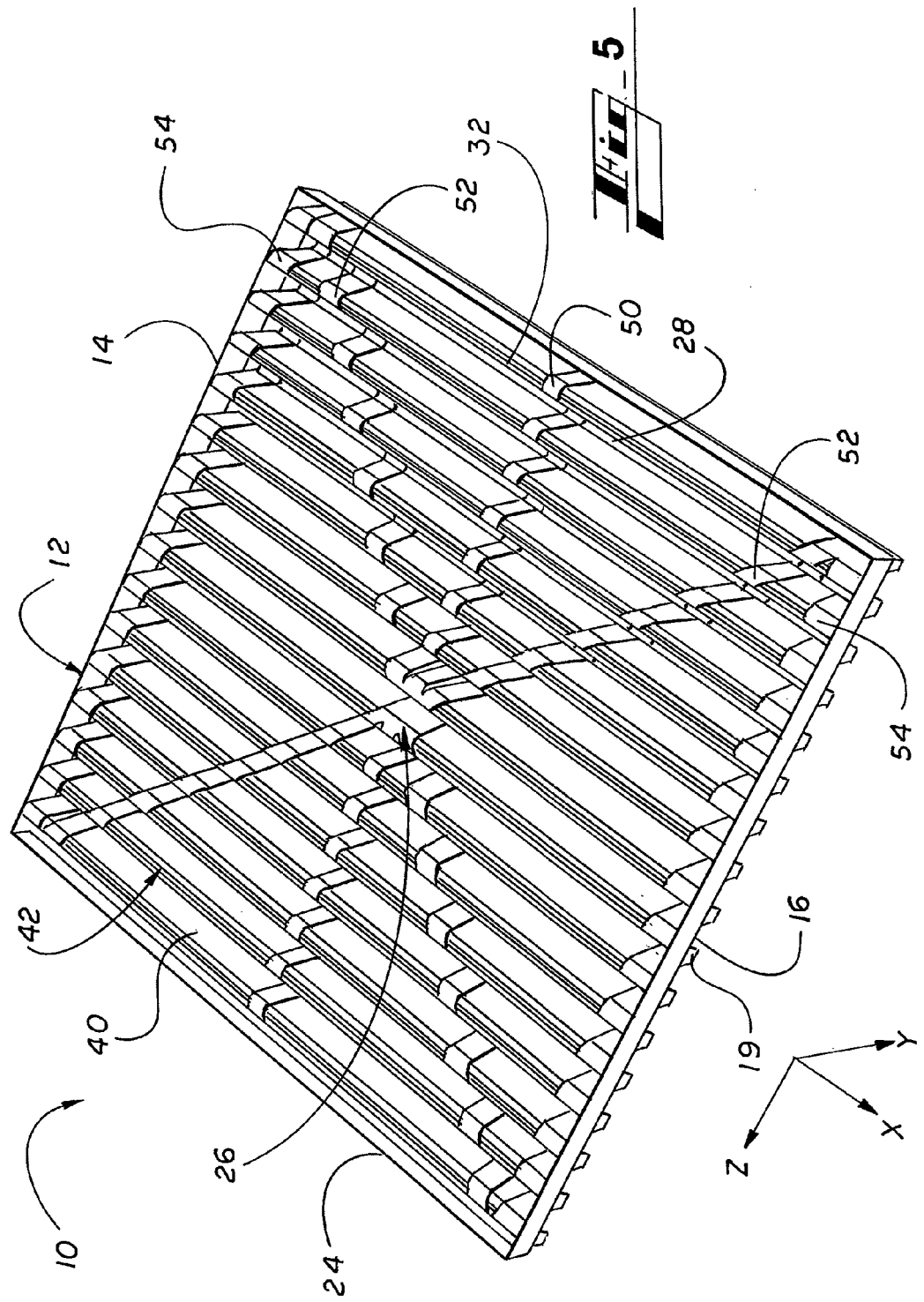

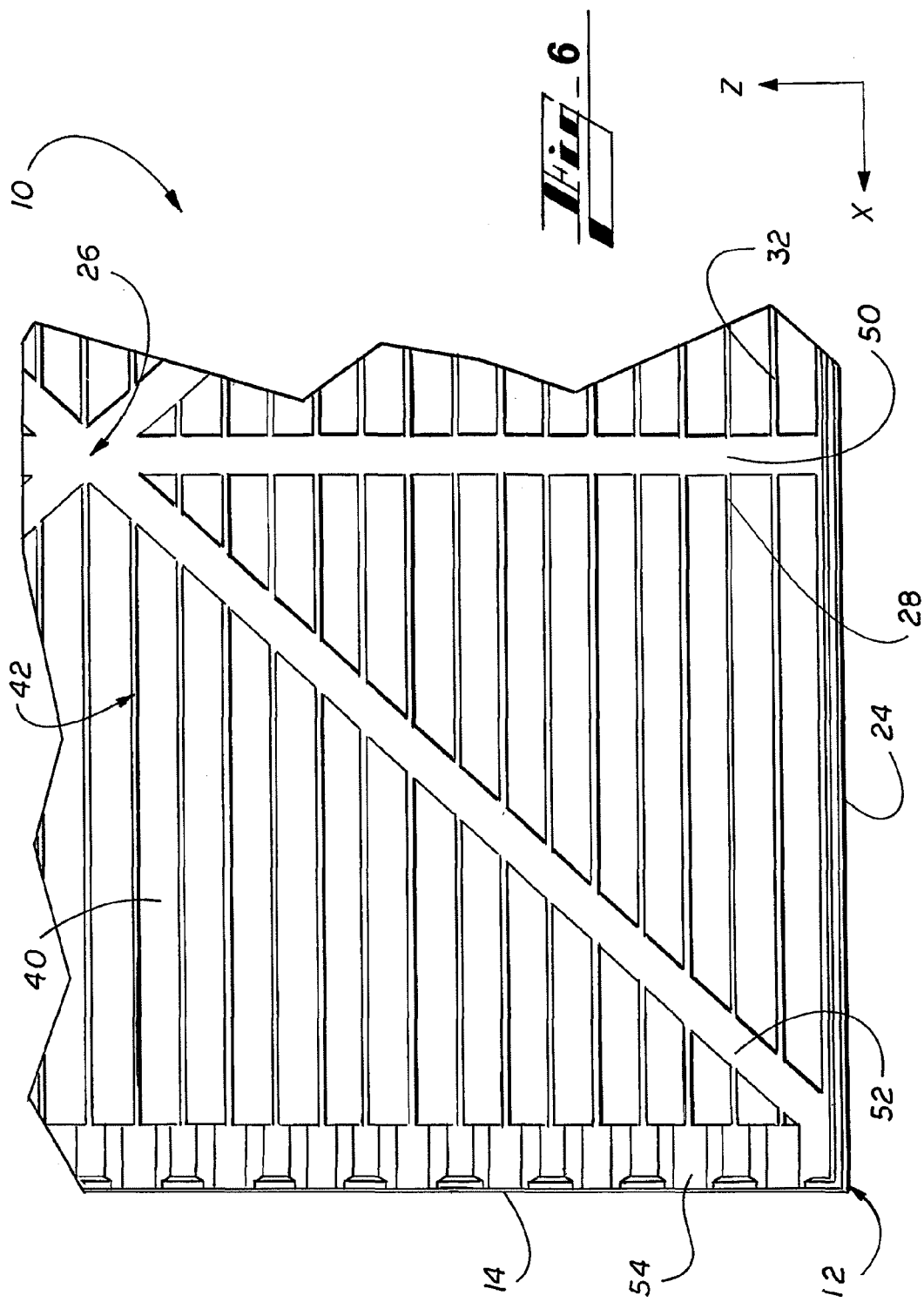

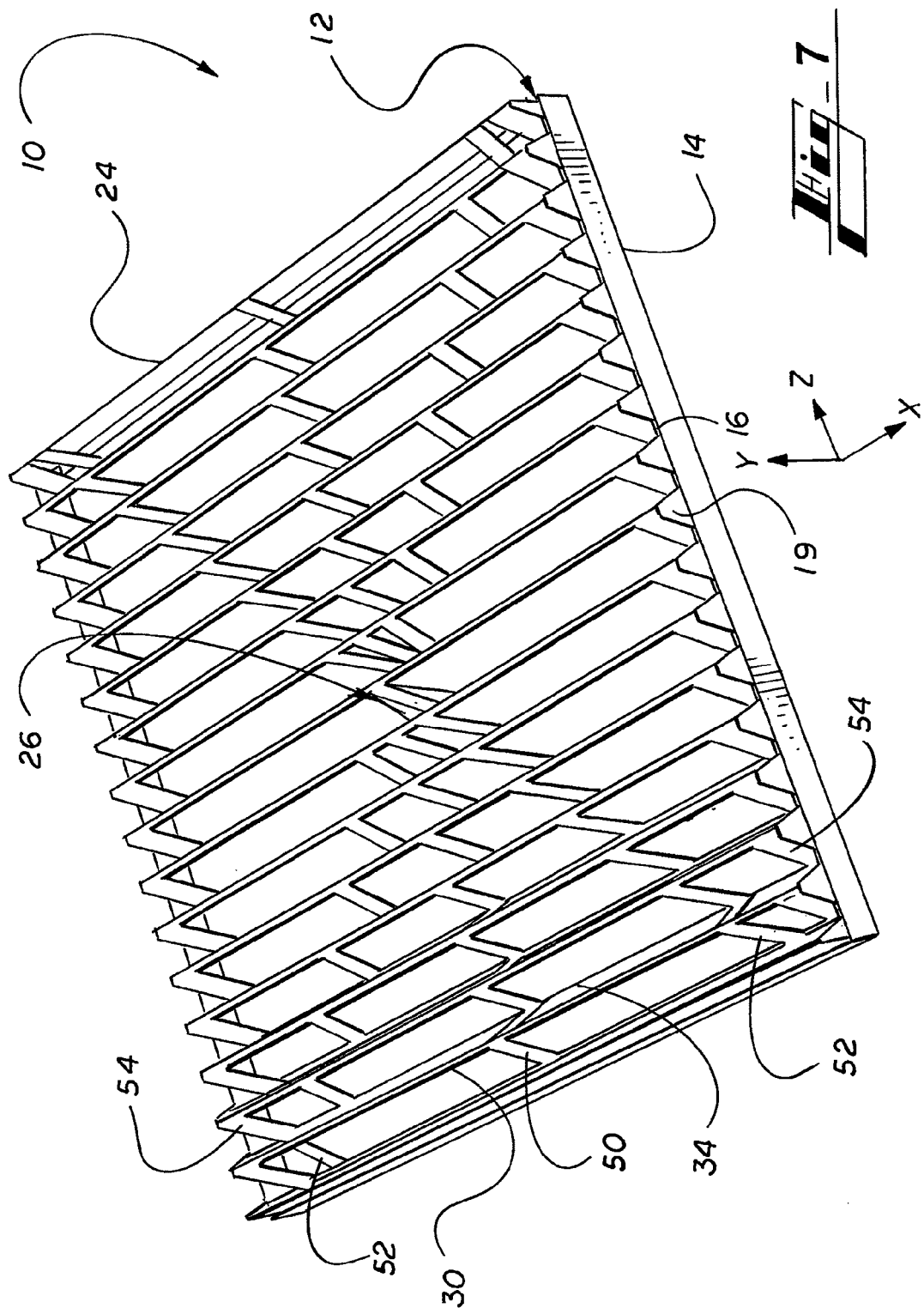

FIG_10

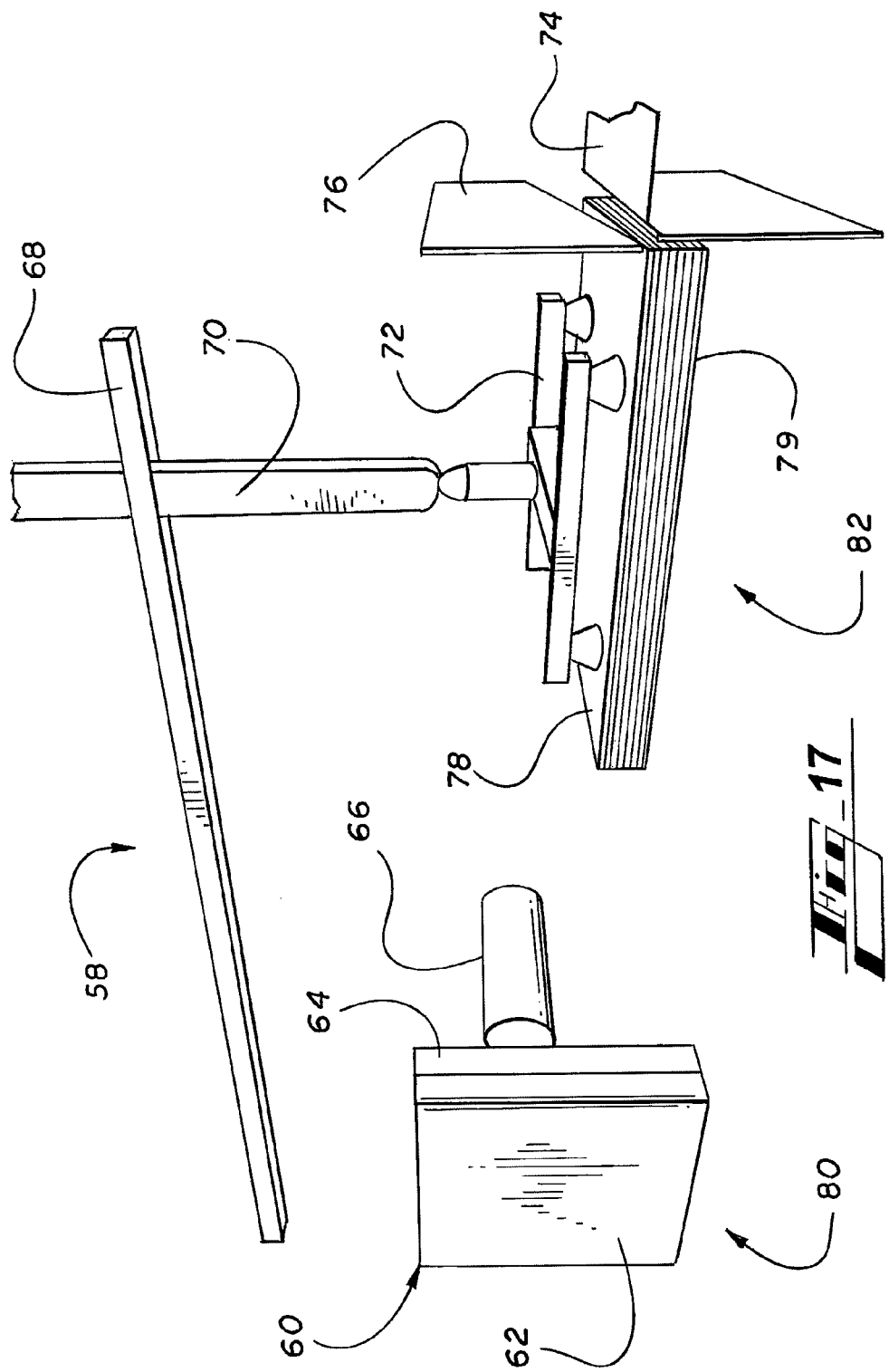

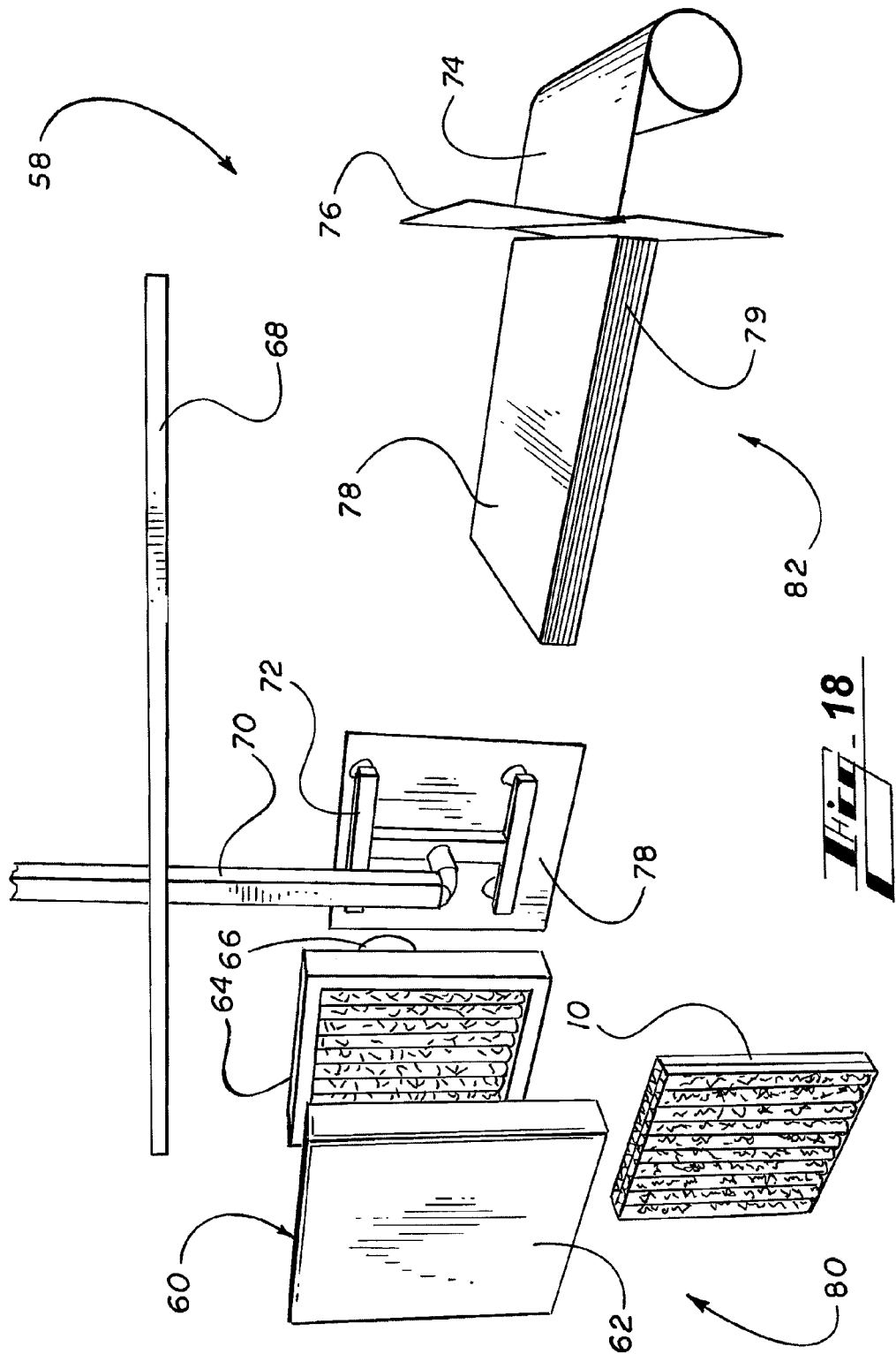

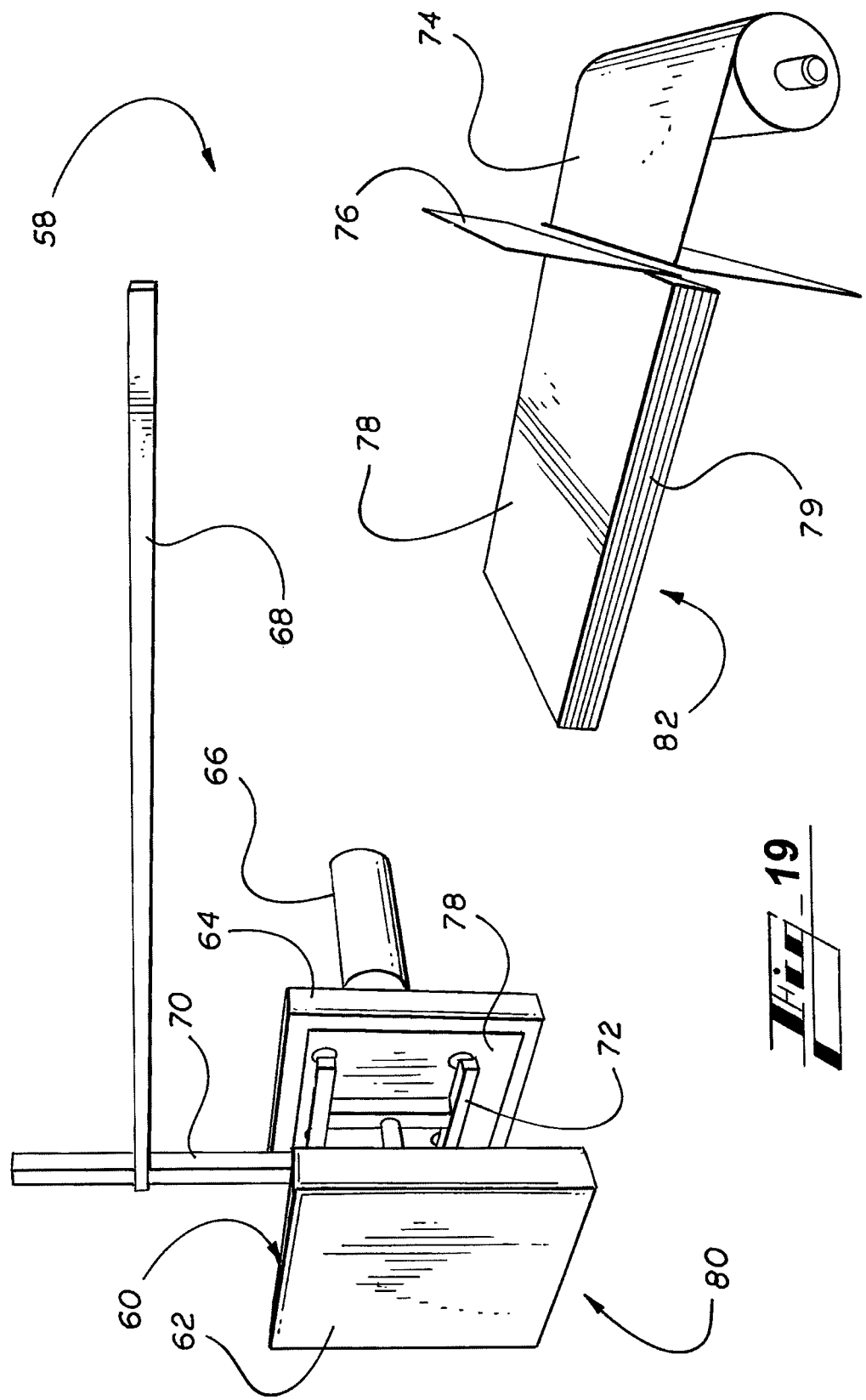

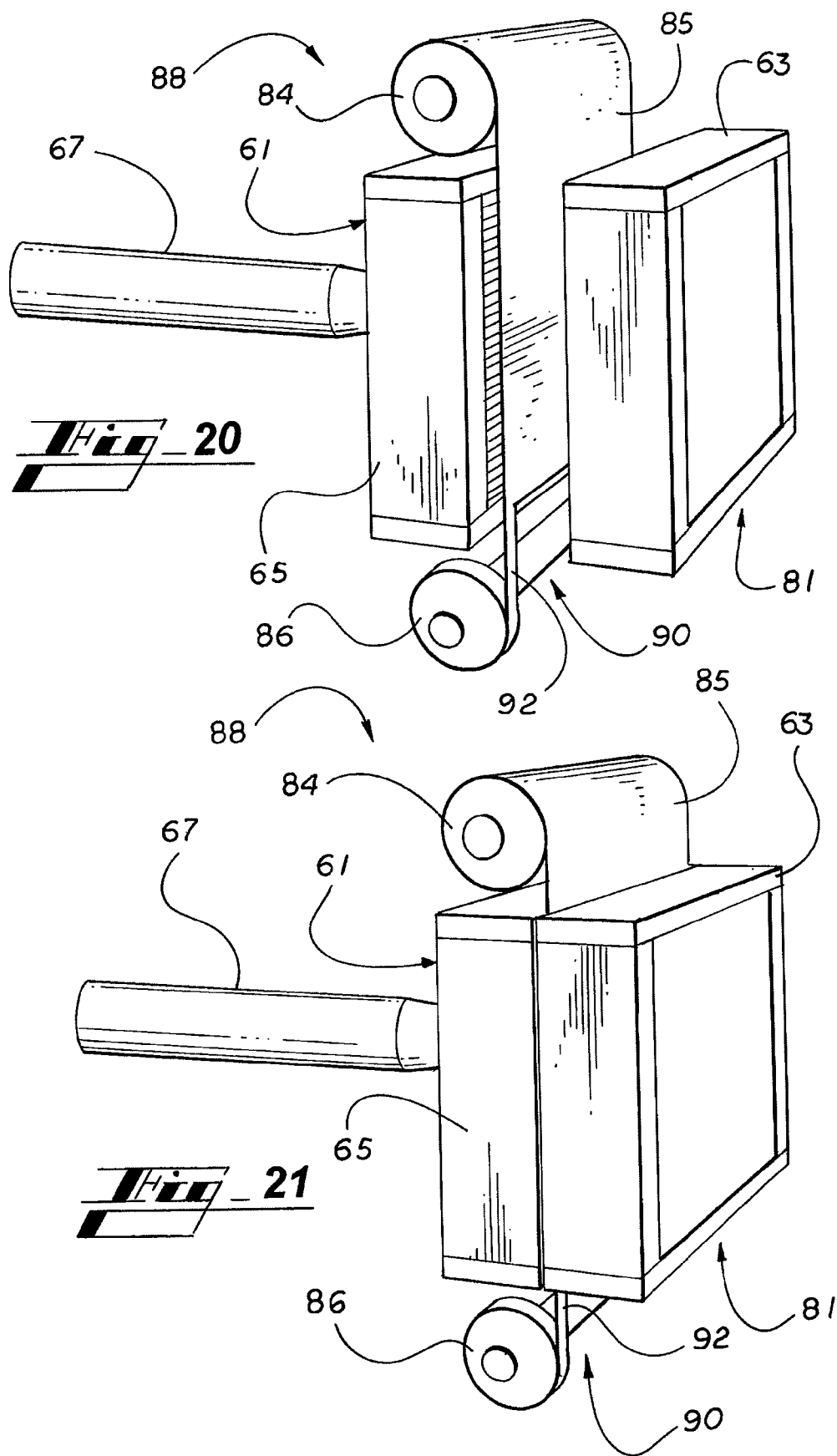

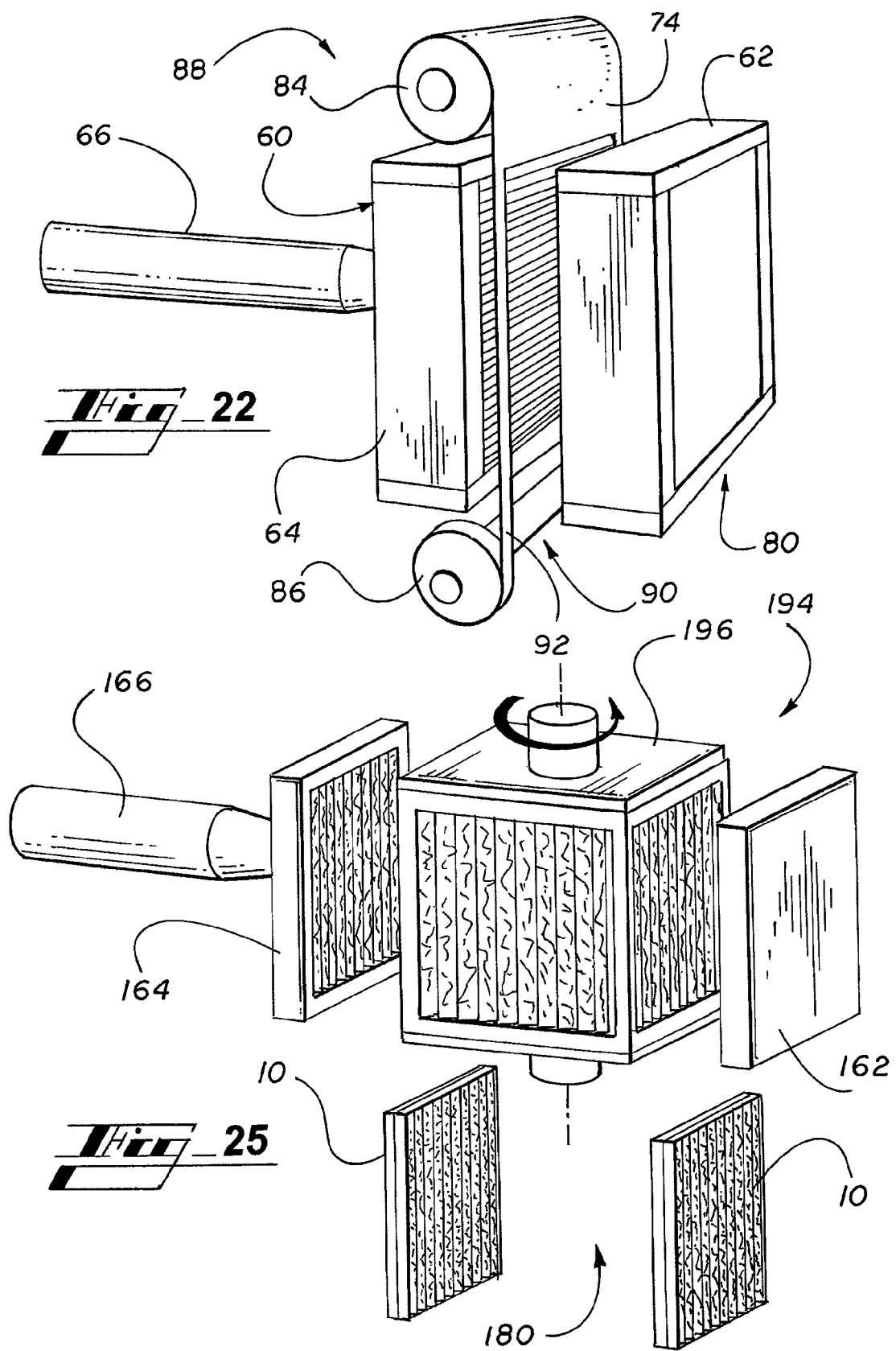

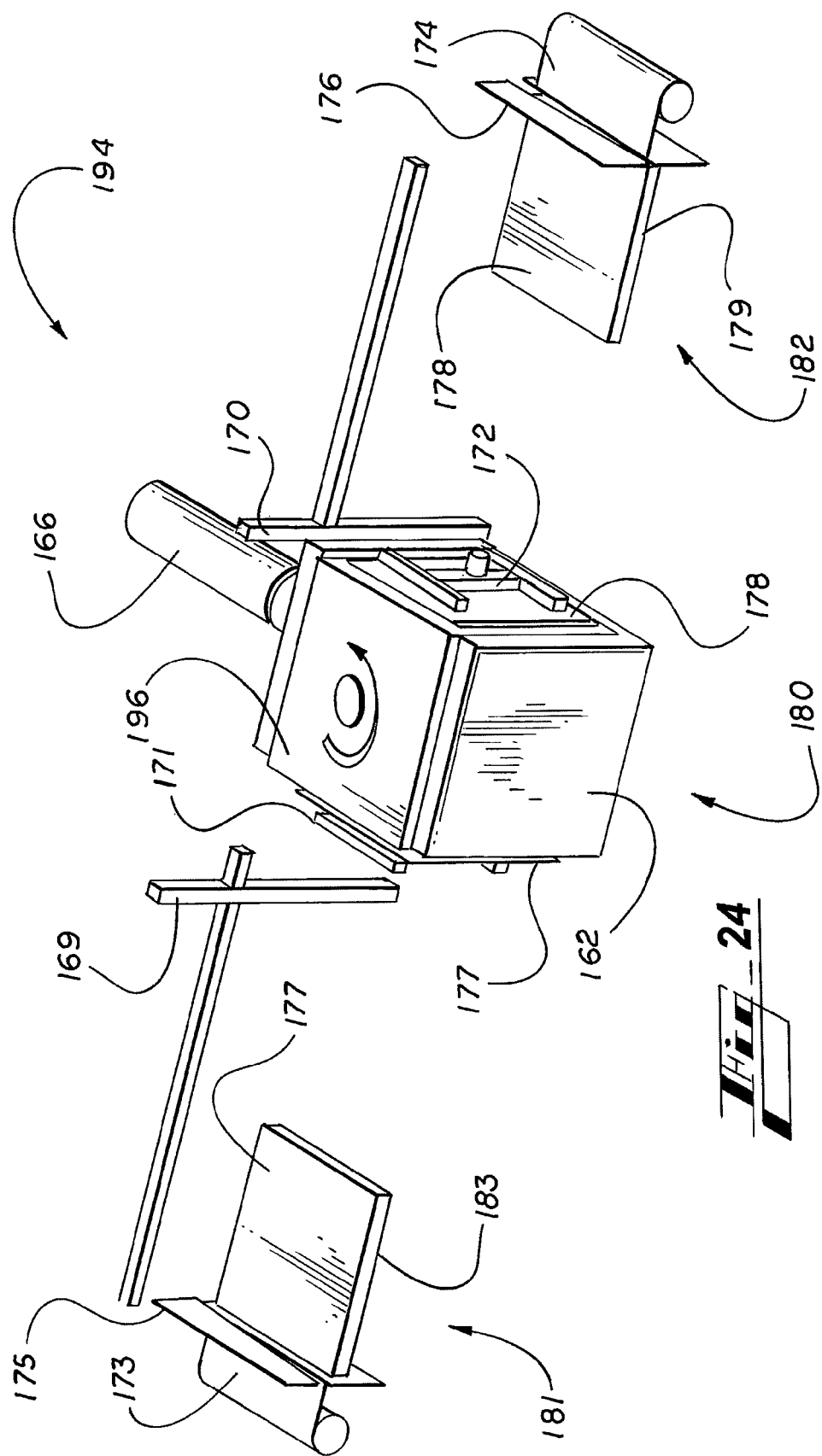

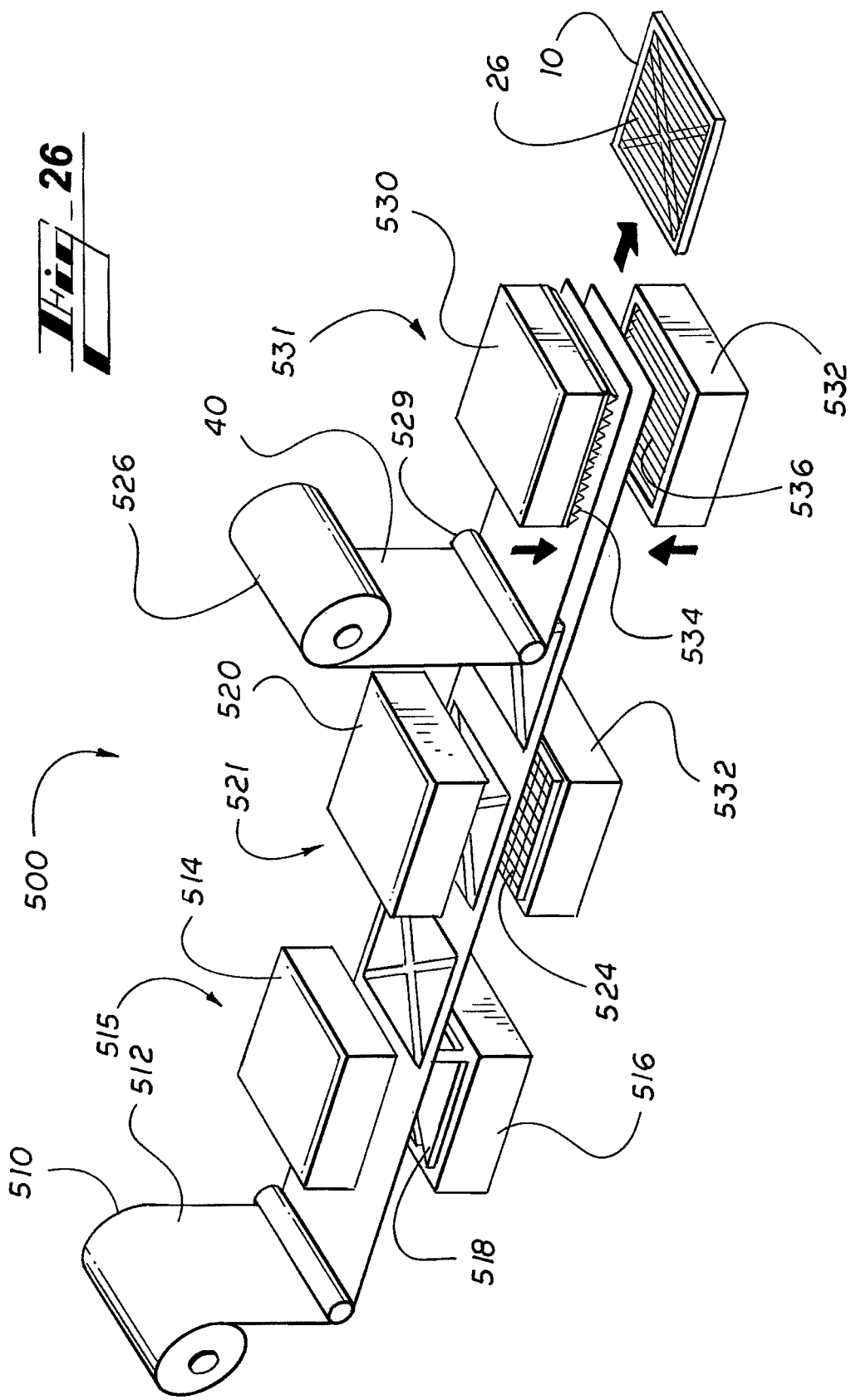

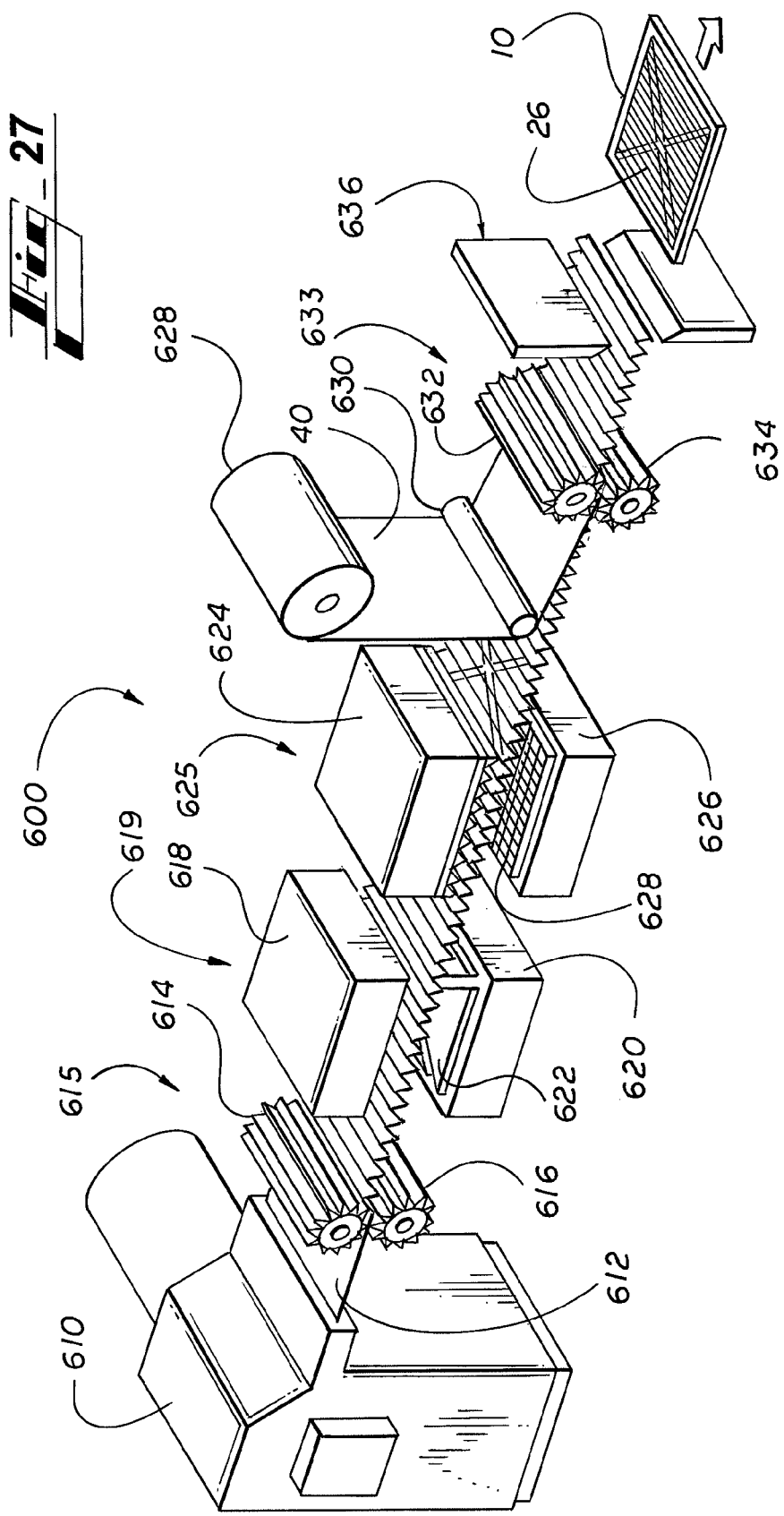

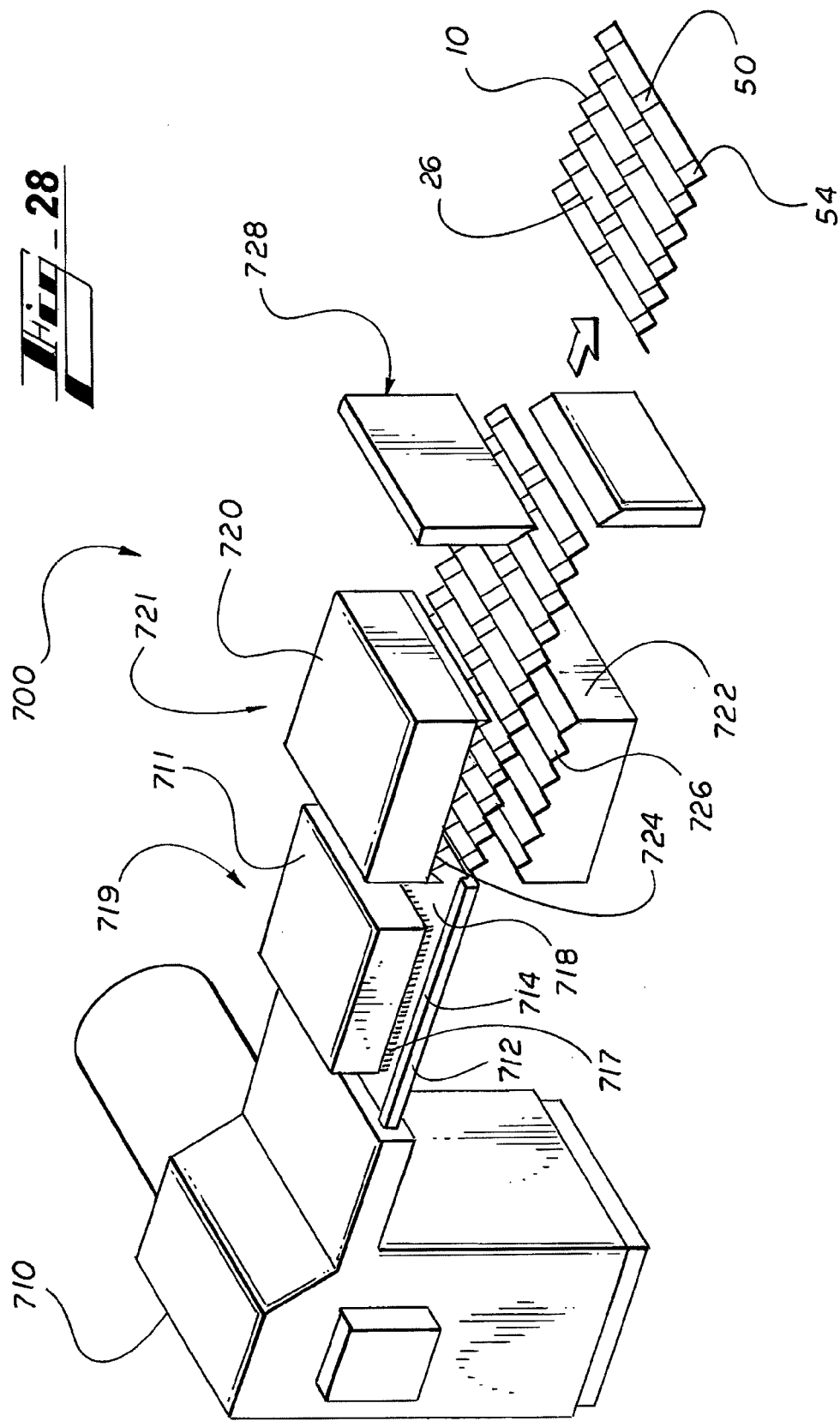

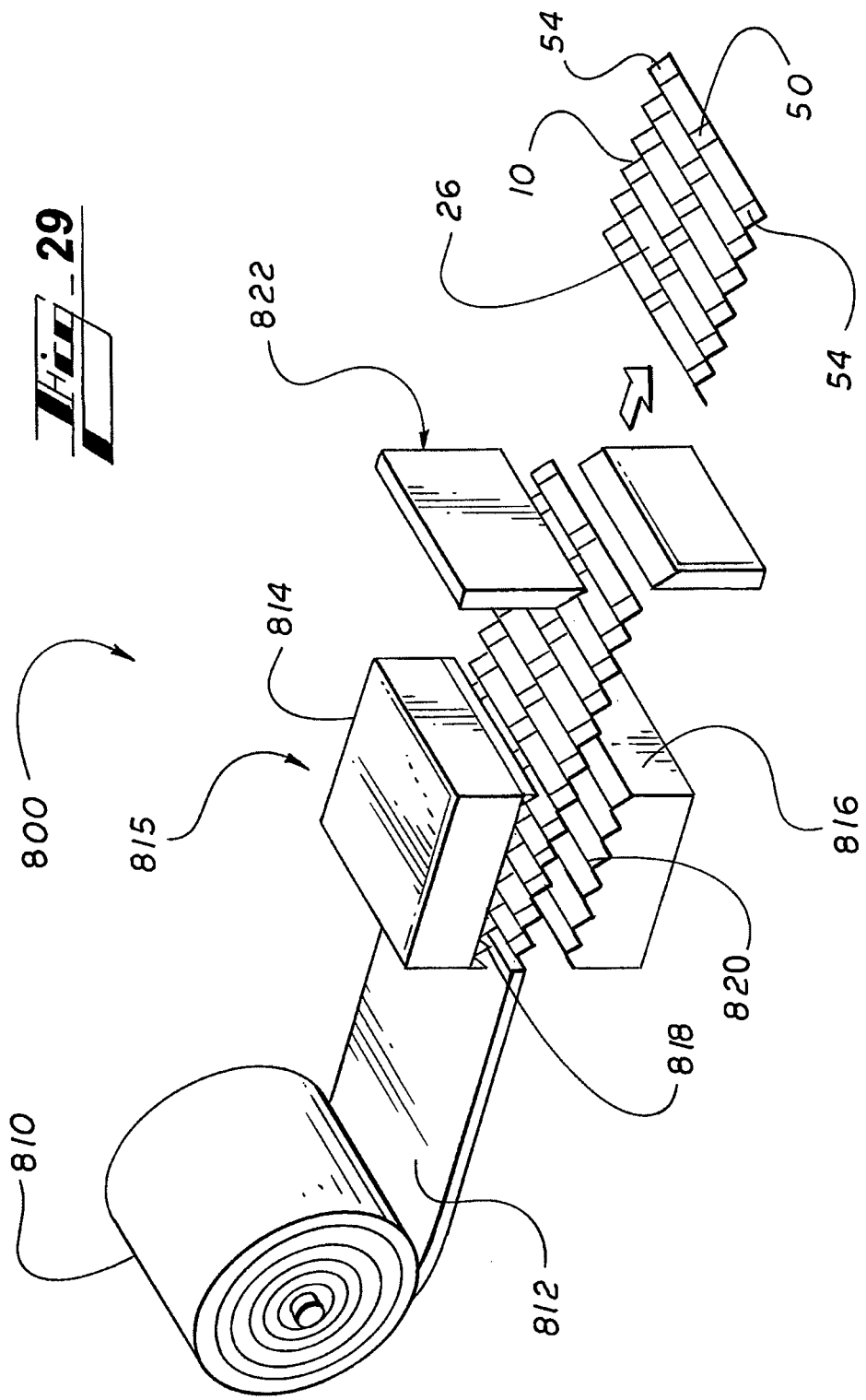

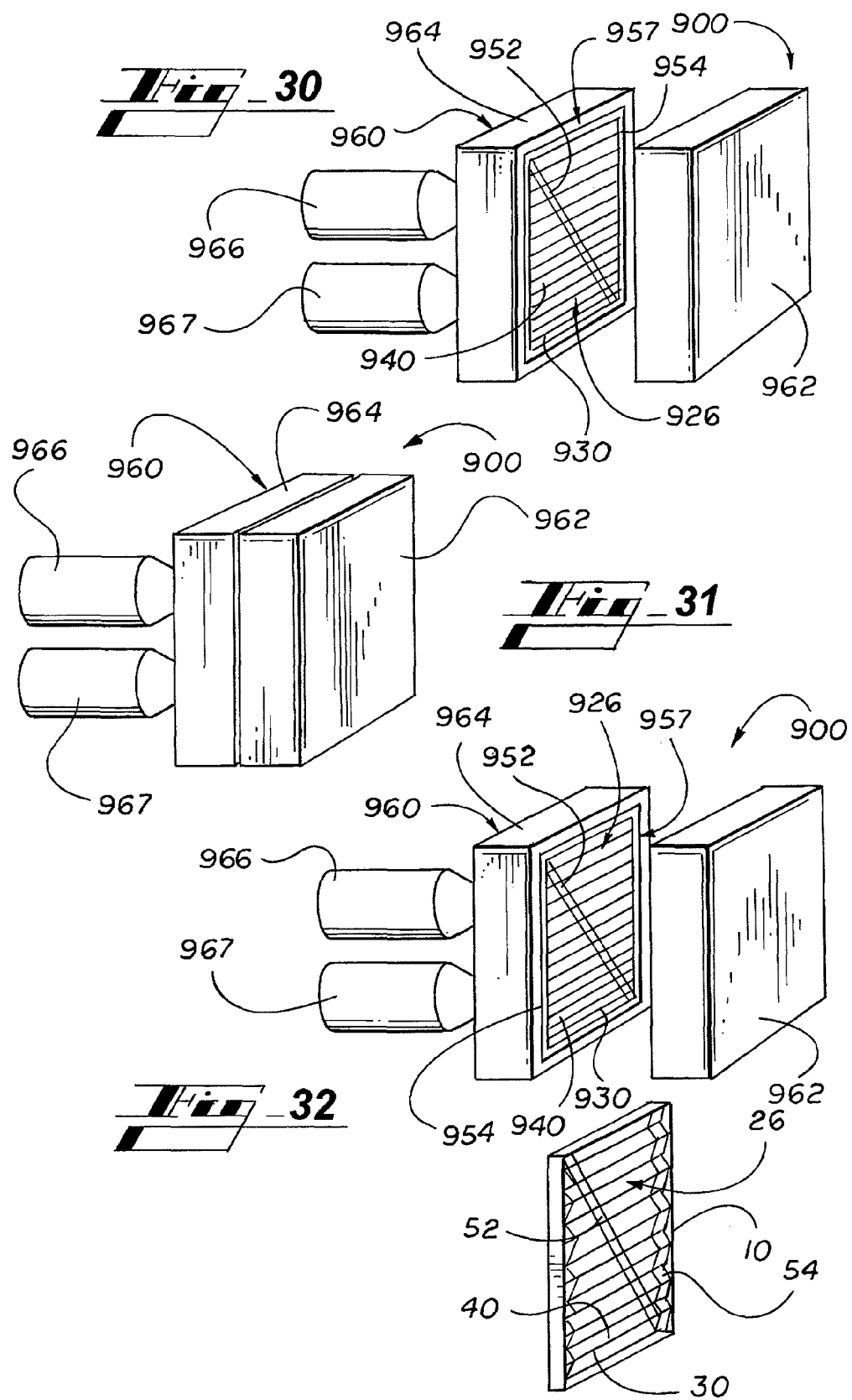

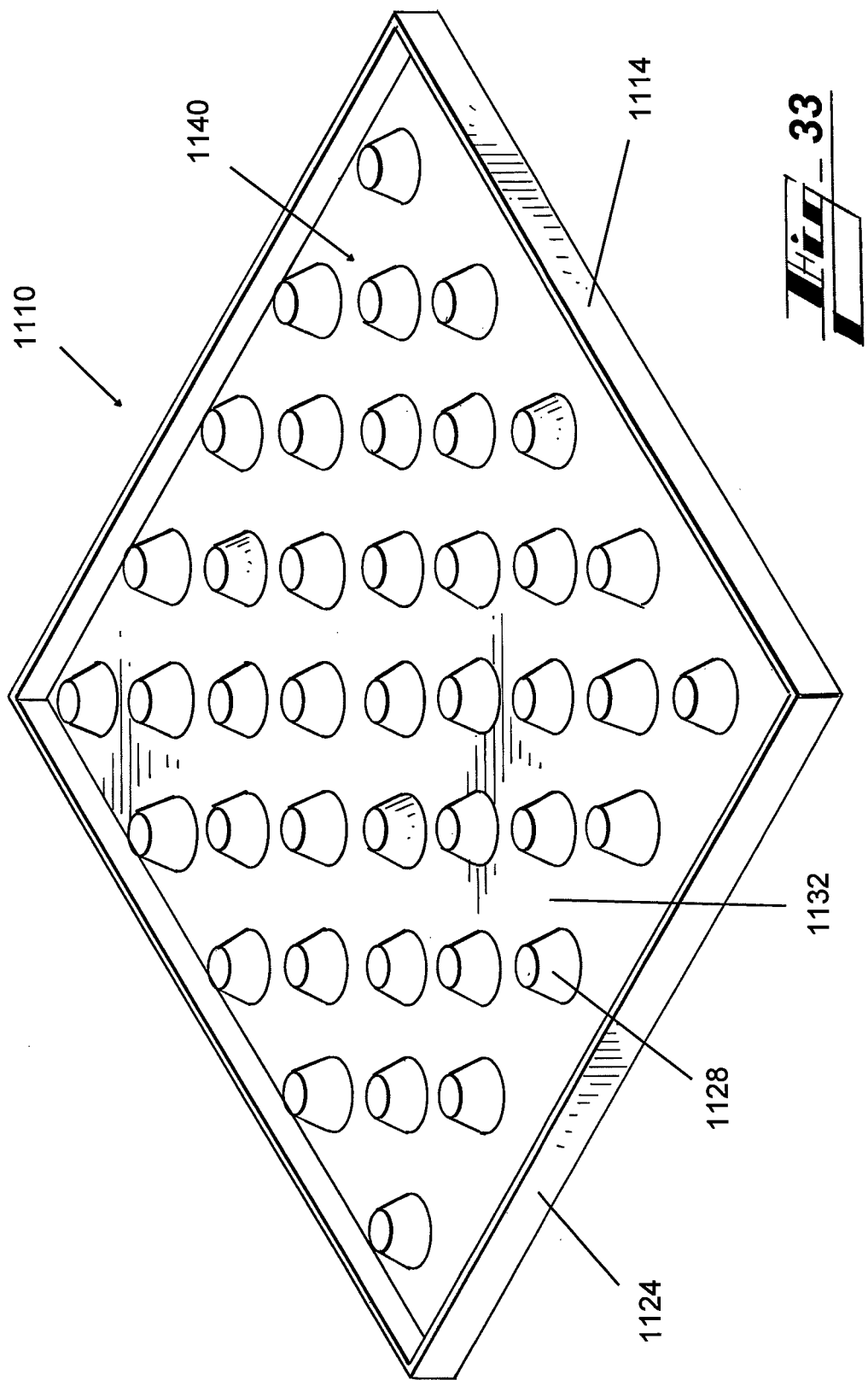

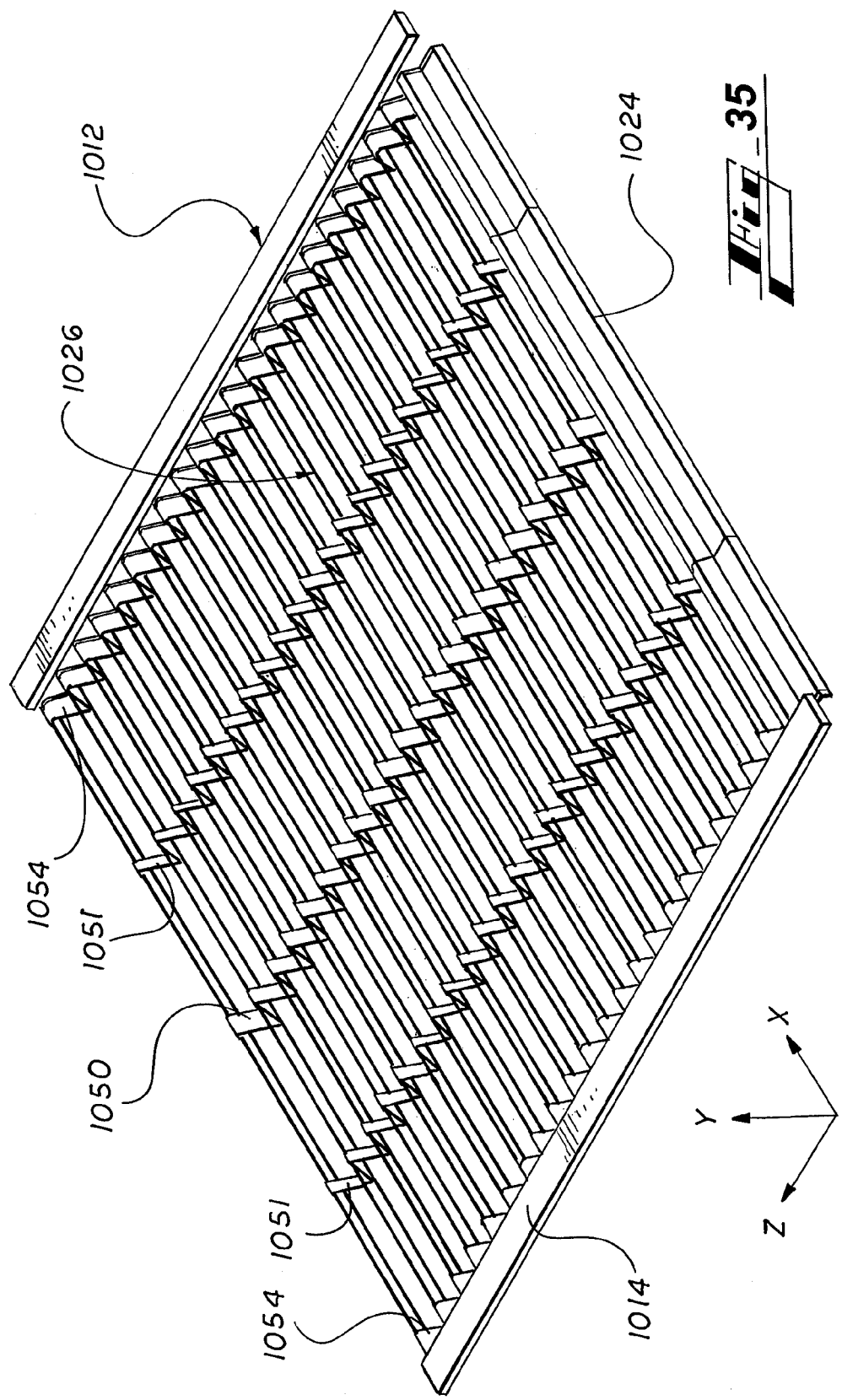

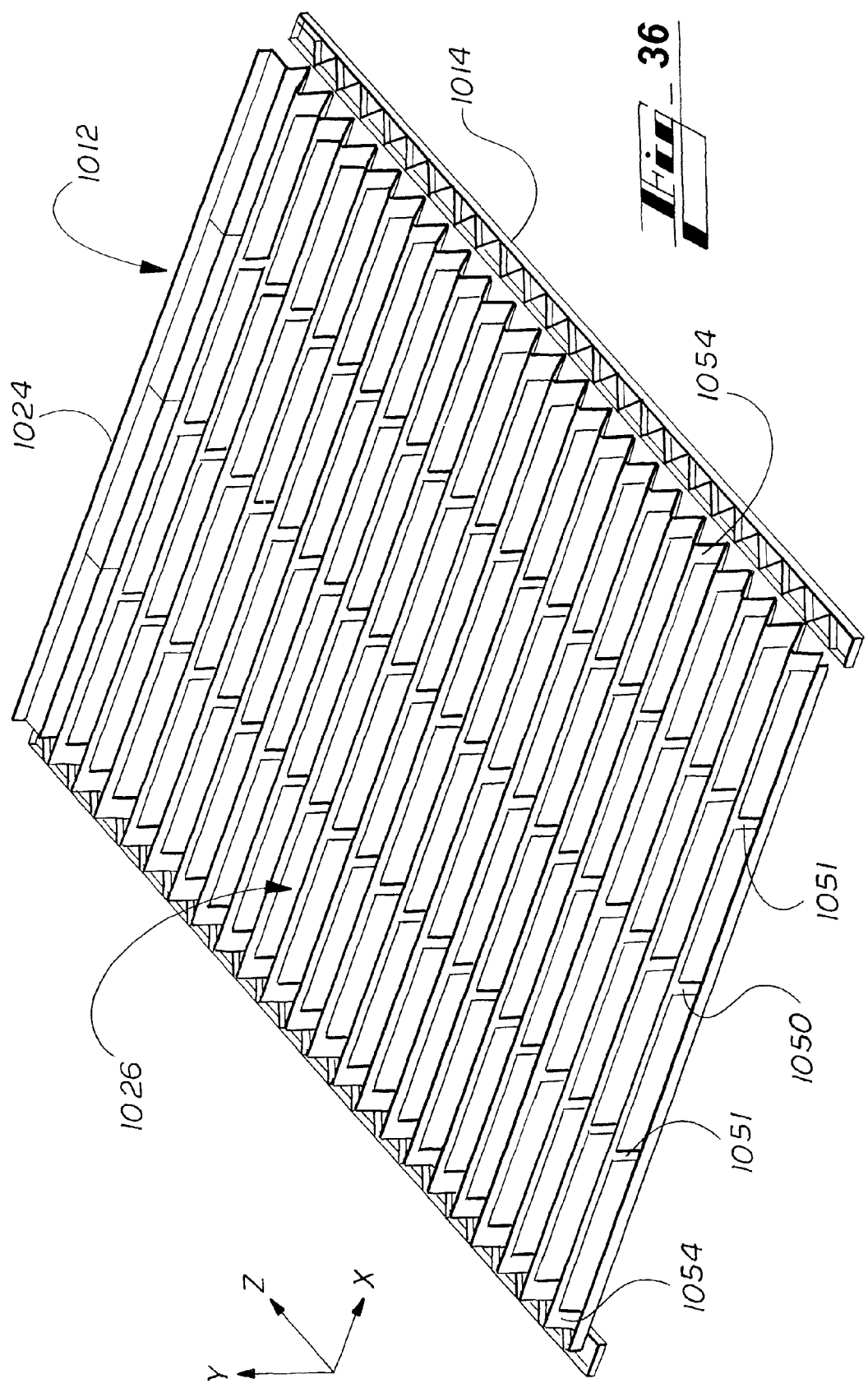

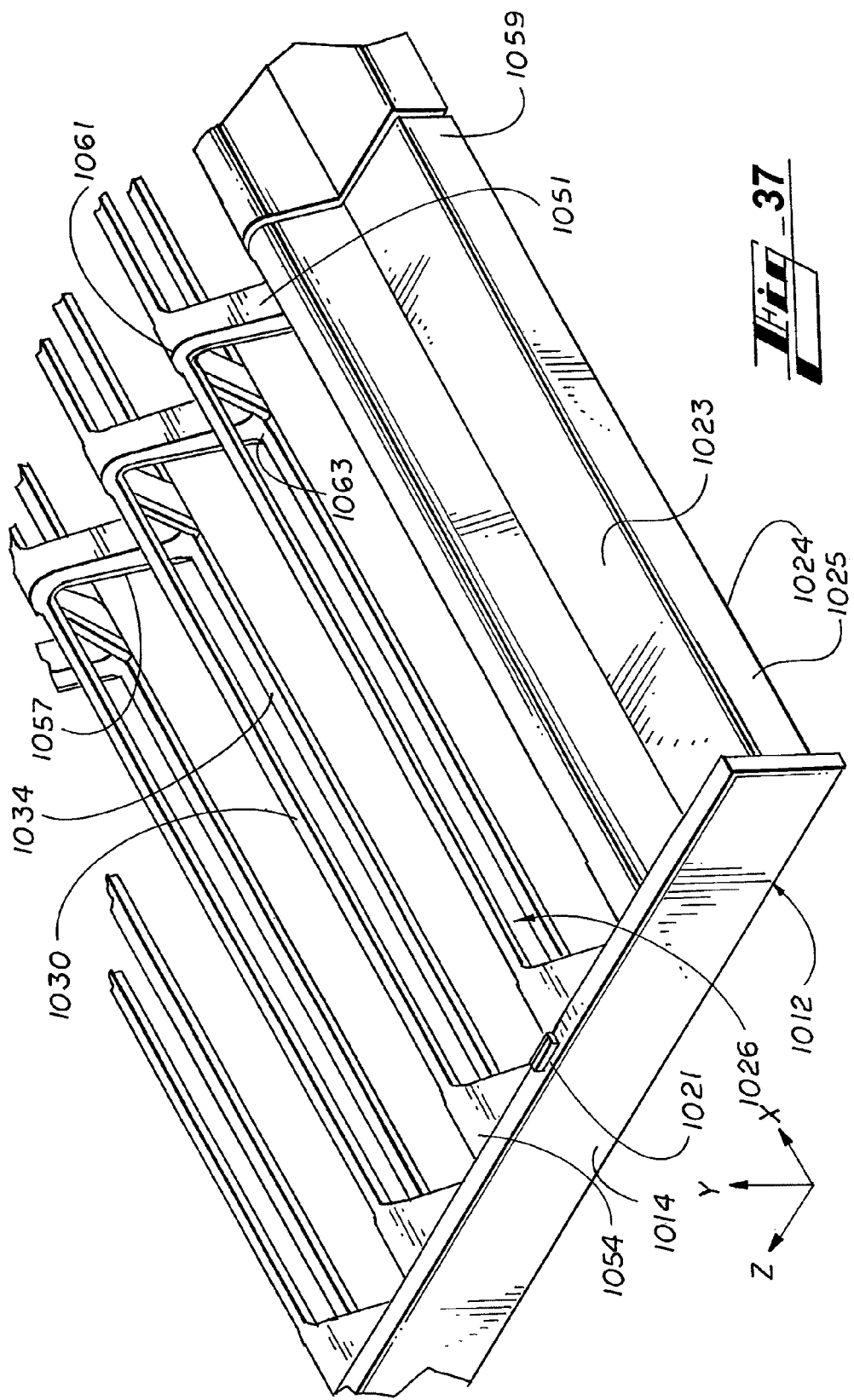

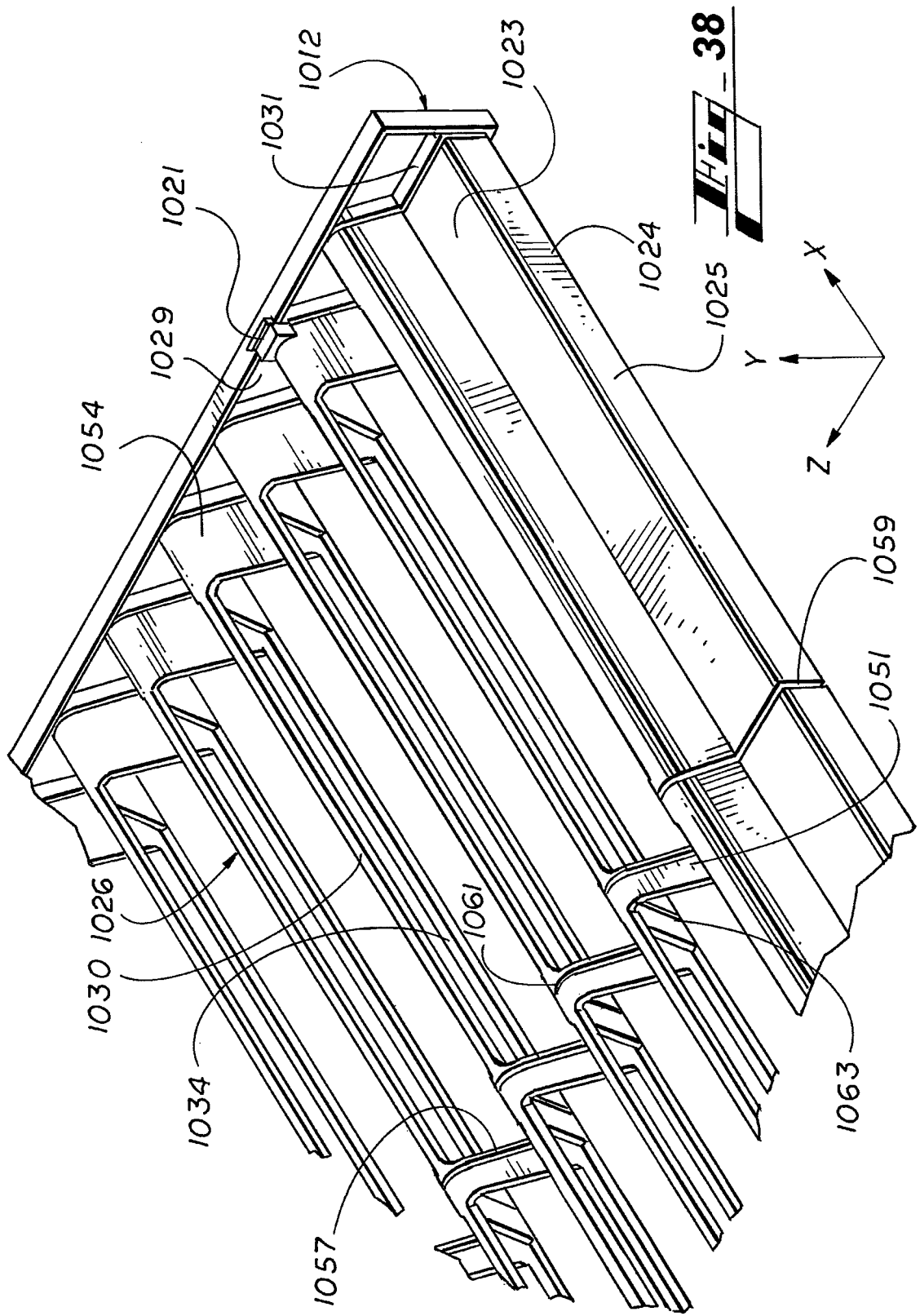

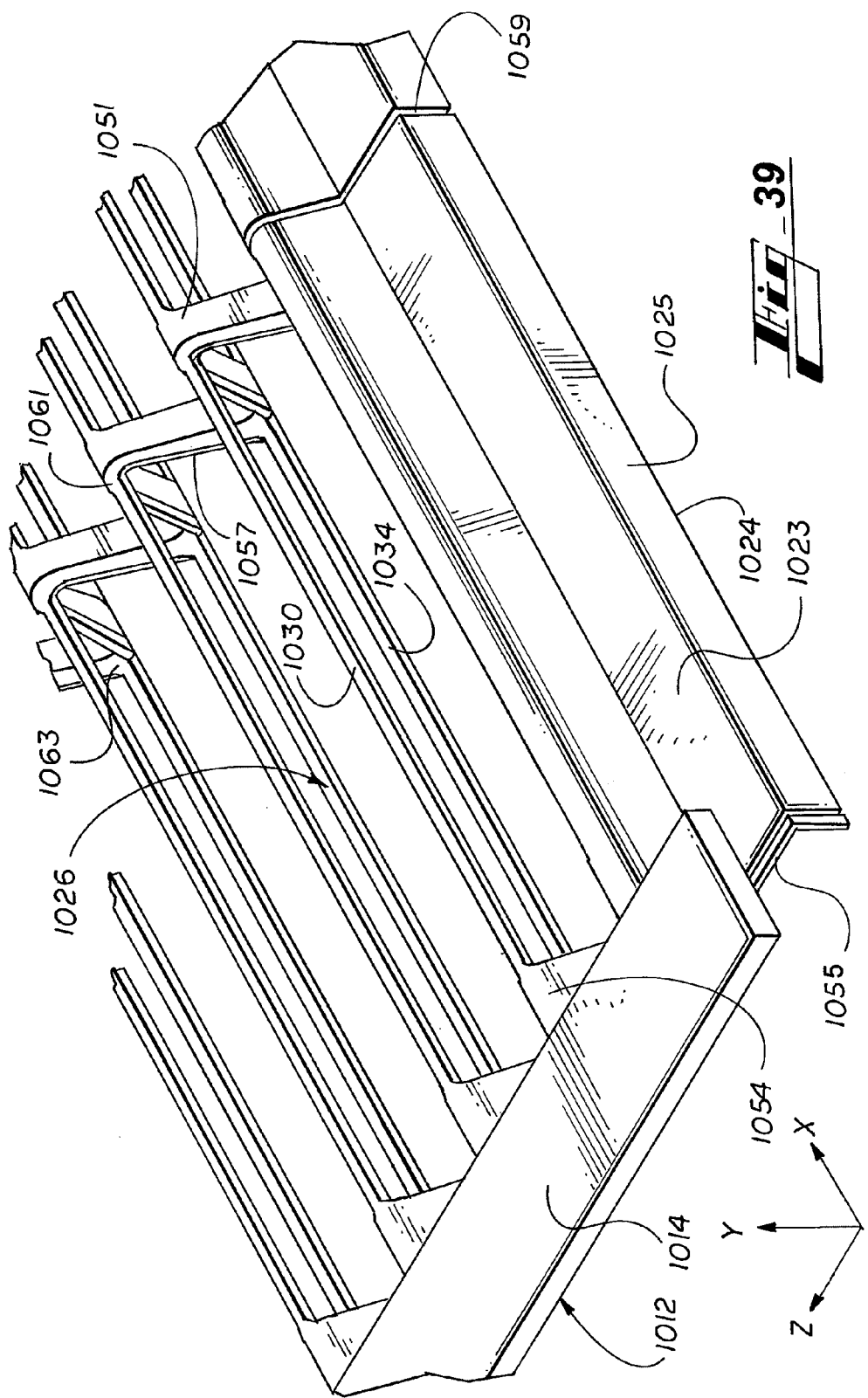

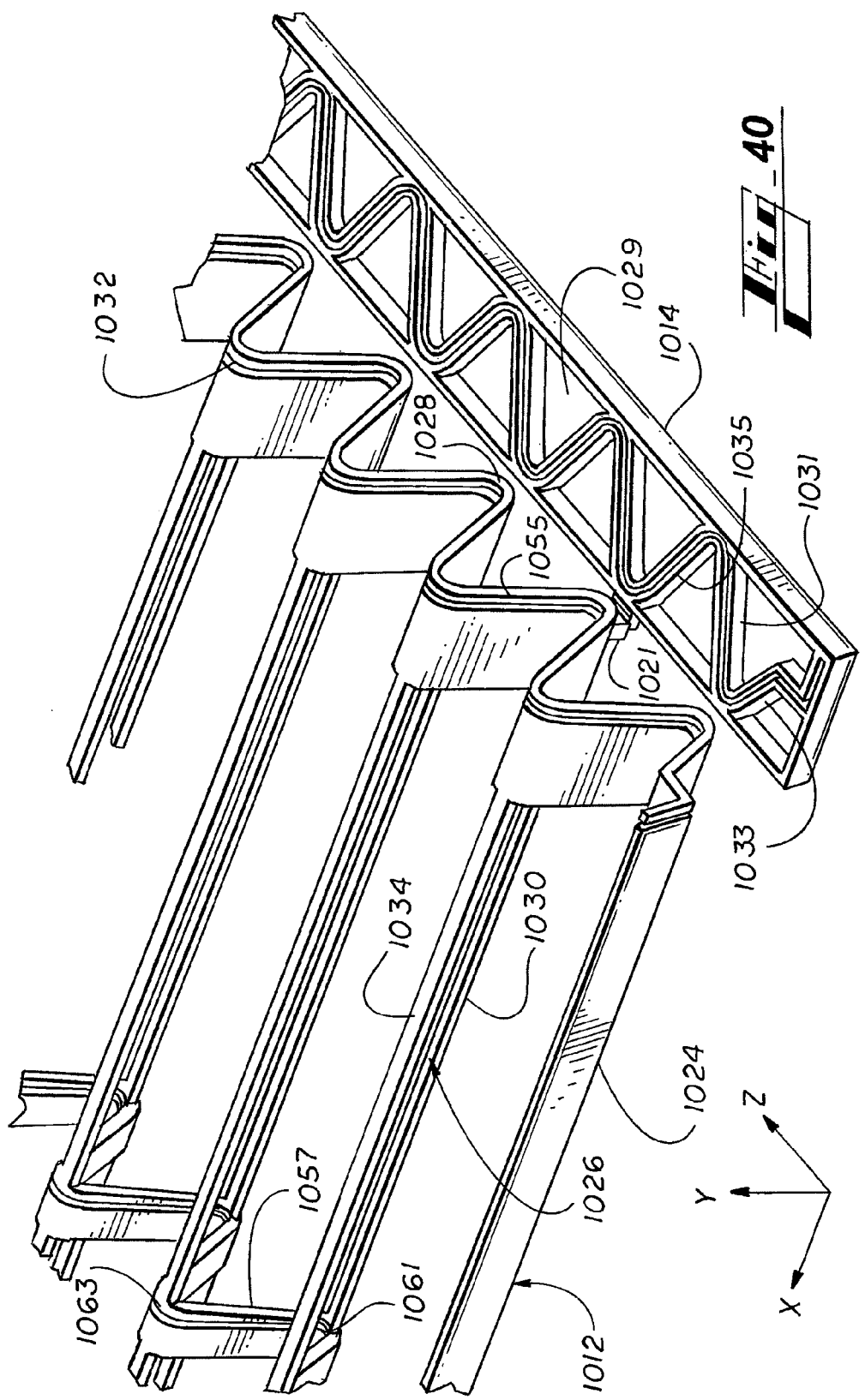

US 8,562,708 B2

THREE-DIMENSIONAL FILTER

CROSS REFERENCE TO RELATED PATENT APPLICATIONS

This invention claims priority from U.S. Provisional Patent Application No. 61/329,808, filed Apr. 30, 2010, which is hereby incorporated by reference.

FIELD OF THE INVENTION

This invention relates to a three-dimensional filter with a flexible filter media mounted on and attached to a formable three-dimensional frame, including without limitation a thermoplastic frame, a thermoset frame, or a molded cardboard frame, and methods for making such a three-dimensional filter.

BACKGROUND OF THE INVENTION

A conventional three-dimensional, pleated filter, such as that used in heating, ventilation, and air conditioning systems (HVAC systems), includes a filter media and a cardboard frame. The filter media is typically a flexible nonwoven material, including without limitation thermoplastic, microglass, paper, or fiberglass materials that are held in a pleated configuration by means of a wire mesh. Alternatively the filter media may comprise a self-supporting material that is held in a pleated configuration by means of the structural integrity of the filter media itself. Such self-supporting pleated filter media tends to be expensive. The conventional pleated filter is typically assembled by hand by installing the filter media in the rectangular cardboard or beverage board frame. The cardboard or beverage board frame is often weak and is subject to deterioration in the presence of moisture in the air to be filtered.

Pleated filters are also used in a variety of other applications, including without limitation oil filters, automobile air and cabin filters, industrial intake air filters, water filters, etc., in which the filter media is pleated and held in a pleated configuration by a wire mesh or other means before the pleated filter media is mounted in a frame. Because such pleated filters are intended to be disposable, the cost of manufacturing such pleated filters is an important consideration in their design and manufacture. Using a wire mesh to support the filter media or using expensive self-supporting filter media and using hand assembly of the pleated filter media into a separate frame results in unnecessary costs. Consequently, there is a need for a pleated filter or other three-dimensional filter that does not require wire mesh, adhesives, or an expensive self-supporting pleated filter media and that can be manufactured by an automated process.

SUMMARY OF THE INVENTION

The present invention addresses the limitations of conventional pleated filters. A pleated filter, or other three-dimensional filter, in accordance with the present invention comprises a formable filter frame on which a flexible filter media is mounted and held in a pleated or other three-dimensional configuration. The filter media comprises a web, generally formed of a nonwoven thermoplastic material or fiberglass with epoxy binders, that is configured to trap pollutants in a fluid stream including a gas stream or a liquid stream. The actual configuration and composition of the filter media and filter media's filtering characteristics are not critical to the present invention. The filter media only has to be flexible enough that, when subjected to heat and/or pressure, the filter media will conform to a linear pleated configuration or other three-dimensional peak and valley configuration. In connection with the present invention, a three-dimensional configuration for the filter media includes not only linearly extending pleats, but also includes any undulating configuration with peaks and valleys, for example, triangular shaped peaks and valleys, spherical shaped peaks and valleys, egg shaped peaks and valleys, conical shaped peaks and valleys, and any other three-dimensional undulating configuration with peaks and valleys.

The formable filter frame of the present invention is generally rectangular in shape, although other geometric shapes for the periphery of the filter frame are within the scope of the invention. For a rectangular formable filter frame, the filter frame comprises a pair of end walls and a pair of side walls. A skeletal structure extends between the end walls and the side walls and provides support for the pleated or other three-dimensional shape of the filter media mounted to the filter frame.

In a first embodiment of the present invention, the skeletal structure includes peak ribs and valley ribs that extend generally parallel to each other and between the end walls. The peak ribs and the valley ribs are offset from each other to define the peaks and valleys of the linear pleated skeletal structure. The skeletal structure in the first embodiment further includes one or more pleated bands that extend between the sides of the filter frame. The pleated bands may extend perpendicular to the linear direction of the linear pleats of the filter media, or the pleated bands may extend diagonally across the filter frame from side to side.

In a second embodiment of the present invention, the skeletal structure includes peak ribs and valley ribs that extend generally parallel to each other and between the end walls. The peak ribs and the valley ribs are offset from each other to define the peaks and valleys of the linear pleated skeletal structure. Intermediate rib supports interconnect the peak ribs and the valley ribs to reinforce and thereby stabilized the peak ribs and the valley ribs. The intermediate rib supports may be small cylindrically shaped ribs of thermoplastic material extending between the peak ribs and the valley ribs, the rib supports may be the result of a perforated web of thermoplastic material extending between the peak ribs and the valley ribs, or the rib supports may result from a mesh like web of thermoplastic material extending between the peak ribs and the valley ribs.

In another embodiment of the present invention, the skeletal structure of the thermoplastic frame is configured with large peak ribs and valley ribs that do not require pleated bands or other intermediate rib supports.

In yet other embodiments of the present invention, the skeletal structure of the thermoplastic frame is configured with shaped peak ribs and shaped valley ribs to form a skeletal structure with an undulating three-dimensional configuration with peaks and valleys including, for example, triangular shaped peaks and valleys, spherical shaped peaks and valleys, egg shaped peaks and valleys, conical shaped peaks and valleys, and any other three-dimensional undulating configuration with peaks and valleys.

Because the filter frames of the present invention are made of thermoplastic materials, the resulting pleated or other three-dimensional filters have a higher degree of structural integrity as compared to conventional pleated filters that employ cardboard or beverage board for the filter frame. In addition, the filter frames made of thermoplastic materials do not deteriorate in the presence heat and humidity which adversely affects the integrity and performance of conventional pleated filters with cardboard or beverage board frames. Because the molded plastic side walls and end walls of the filter frame can be molded in a variety of configurations, as compared to the single flat configuration of the prior art cardboard or beverage board filter frame, the molded plastic filter frame can be configured to have a high degree of integrity and can be configured to allow nesting of the pleated filters in a stack to reduce the volume required for packaging, shipping, and storage. Particularly, in another embodiment of the present invention, the filter frame has hinged end walls that fold up to close the ends of the skeletal structure when the pleated filter is in use, and fold down to accommodate stacking of the pleated filters for packaging, shipping, and storage. Also, the end walls can be configured with fasteners so that the end walls can be disconnected from the skeletal structure to allow nesting of the skeletal structure during packaging, shipping, and storage and so that the end walls can be connected to the skeletal structure prior to use of the filter. Because the end walls are connected to the skeletal structure prior to use of the filter, the skeletal structure can be trimmed to standard sizes before the end walls are connected by means of the fasteners to the skeletal structure.

Further, because the pleated filter media and the filter frame can be made of the same thermoplastic material, such as polypropylene, the pleated filter can be recycled without disassembly.

A first method for making the pleated filter of the present invention includes inserting the preformed filter media into a mold, holding the filter media in place in the mold, closing the mold, and injection molding the thermoplastic filter frame while in contact with the filter media so that hot thermoplastic material forming the thermoplastic filter frame bonds to the filter media and holds the filter media in the configuration of the molded skeletal structure of the plastic filter frame. The mold may be configured to create pleats with peaks and valleys or any other undulating three-dimensional pattern. Alternatively, the thermal plastic filter frame can be molded separately, and the preformed filter media is then welded or glued to the molded skeletal structure of the plastic filter frame.

In a second method for making the pleated filter of the present invention, the pleated filter is made by thermoforming. In the thermoforming process, a web of thermoplastic material is die cut or cut by a computer numerically controlled (CNC) cutter to produce a filter frame with a skeletal structure and with open areas for the location of the filter media. The filter frame, cut from the thermoplastic sheet, is then heated in the oven to soften the thermoplastic filter frame. The filter media and the hot thermoplastic filter frame are joined together and are placed on a temperature controlled mold (about 125° F.). A vacuum is pulled through the temperature controlled mold to form the pleated filter comprising the pleated thermoplastic filter frame and the filter media. In addition, a pressure box may be placed over the pleated filter and the mold, and positive air pressure is applied within the pressure box to assist in the formation of the pleated filter. Besides pleats, the mold may be configured to create any other undulating three-dimensional pattern. Once the thermoforming process is complete, the resulting pleated filter is ejected from the mold, and the edges of the pleated filter are die cut or trimmed. The thermoforming process can be done in a rotary or linear fashion. Alternatively, the pleated filter media and the skeletal structure of the plastic filter frame can be formed separately by thermoforming and then welded or glued together.

In a third method, the plastic filter frame may be extruded to produce the pleated filter. A thermoplastic sheet is extruded from an extrusion die, and the extruded thermoplastic sheet and is run through temperature controlled roll forms (cooling and setting) to pleat the thermoplastic sheet and thus form of the skeletal structure of the filter frame. Besides pleats, the controlled roll forms may be configured to create any other undulating three-dimensional pattern. The pleated thermoplastic sheet with its pleated configuration is then run through a rotary or linear die or a CNC routing head to cut open areas in the pleated thermoplastic sheet to form the skeletal structure of the filter frame. The resulting filter frame with its peaks and valleys is softened by the application of heat and then joined with and bonded to the filter media by controlling the temperature of the filter frame and the filter media so that bonding occurs. Alternatively, the filter media may be joined to the filter frame by gluing the filter media to the filter frame. The resulting web of filter frame and filter media is sheared to length to create the final pleated filter. Alternatively, the pleating step in the process could be performed after the filter frame is softened and joined with the filter media.

A fourth method of making the pleated filter or other three-dimensional filter of the present invention includes molding or extruding thermoplastic material that includes a continuous web of thermoplastic material with an integral skeletal structure. Once the continuous web of thermoplastic material has been formed with the integral skeletal structure, the web is needle punched on those portions of the continuous web of thermoplastic material that do not include the integral skeletal structure. In that way, the filter media is created by the needle punching in those areas of the continuous web of thermoplastic material between the integral skeletal structures. Once the continuous web of thermoplastic material has been needle punched, the continuous web of thermoplastic material is pleated (or otherwise formed into a three-dimensional pattern), and the individual pleated filters are sheared from the continuous web. The resulting pleated filter comprises needle punched areas, which constitute the filter media, and skeletal structures of the filter frame, which provide the necessary support for the needle punched filter media.

In a fifth method, the pleated filter or other three-dimensional filter may be constructed in a single step by molding the filter frame directly from the filter media. A batt of filter media, such as a polyester batt or an acrylic and fiber glass batt, is selectively subjected to heat and pressure in a mold to selectively produce a rigid filter frame in those areas subjected to the heat and pressure while leaving the remaining areas unchanged to serve as the filter media.

In a sixth method, the pleated filter or other three-dimensional filter may be constructed in a single step by injection molding the filter media and the skeletal structure in the same injection mold. In one embodiment, two separate thermoplastic materials are used, one for the skeletal structure and the other for the filter media, in order to produce filter media fibers that are not affected by the molding process of the skeletal structure. In another embodiment, a single thermoplastic material may be used to injection mold both the filter media and the skeletal structure.

Further objects, features and advantages will become apparent upon consideration of the following detailed description of the invention when taken in conjunction with the drawings and the appended claims.

BRIEF DESCRIPTION OF THE DRAWINGS

FIG. 1 is a top perspective view of a first embodiment of a pleated filter in accordance with the present invention with a filter media attached to a skeletal structure of a filter frame.

FIG. 2 is a top plan view of the first embodiment of the pleated filter in accordance with the present invention with the filter media attached to the skeletal structure of the filter frame.

FIG. 3 is a side elevation view of the first embodiment of the pleated filter in accordance with the present invention.

FIG. 4 is an end elevation view of the first embodiment of the pleated filter in accordance with the present invention.

FIG. 5 is a bottom perspective view of the first embodiment of the pleated filter in accordance with the present invention with the filter media attached to the skeletal structure of the filter frame.

FIG. 6 is a bottom plan view of the first embodiment of the pleated filter in accordance with the present invention with the filter media attached to the skeletal structure of the filter frame.

FIG. 7 is a top perspective view of the first embodiment of the pleated filter in accordance with the present invention with the filter media removed in order to show the details of the skeletal structure of the filter frame.

FIGS. 17-19 are schematic views illustrating three steps of a first injection molding method in accordance with the present invention for making the pleated filter.

FIGS. 20-22 are schematic views illustrating three steps of a second injection molding method in accordance with the present invention for making the pleated filter.

FIGS. 23-25 are schematic views illustrating three steps of a third injection molding method in accordance with the present invention for making the pleated filter.

FIG. 26 is a schematic view illustrating a thermoforming method in accordance with the present invention for making the pleated filter.

FIG. 27 is a schematic view illustrating an extrusion method in accordance with the present invention for making the pleated filter.

FIG. 28 is a schematic view illustrating an extrusion and needle punch method in accordance with the present invention for making the pleated filter.

FIG. 29 is a schematic view illustrating a molding method in accordance with the present invention for making the pleated filter.

FIGS. 30-32 are schematic views illustrating an injection molding method in accordance with the present invention for making the pleated filter.

FIG. 33 is a top perspective view of a sixth embodiment of the pleated filter in accordance with the present invention showing conical shaped peaks and plainer valleys.

FIG. 35 is a top perspective view of the seventh embodiment of the pleated filter in accordance with the present invention with the filter media removed from the skeletal structure of the filter frame for clarity and showing hinged end walls in the open/stacking position.

FIG. 36 is a bottom perspective view of the seventh embodiment of the pleated filter in accordance with the present invention with the filter media removed from the skeletal structure of the filter frame for clarity and showing hinged end walls in the open/stacking position.

FIG. 37 is an enlarged top perspective view of the seventh embodiment of the pleated filter in accordance with the present invention with the filter media removed from the skeletal structure of the filter frame for clarity and showing the hinged end wall in the closed position.

FIG. 38 is an enlarged top perspective view of the seventh embodiment of the pleated filter in accordance with the present invention with the filter media removed from the skeletal structure of the filter frame for clarity and showing the hinged end wall in the closed position.

FIG. 39 is an enlarged top perspective view of the seventh embodiment of the pleated filter in accordance with the present invention with the filter media removed from the skeletal structure of the filter frame for clarity and showing the hinged end wall in the open/stacking position.

FIG. 40 is an enlarged bottom perspective view of the seventh embodiment of the pleated filter in accordance with the present invention with the filter media removed from the skeletal structure of the filter frame for clarity and showing the hinged end wall in the open/stacking position.

DETAILED DESCRIPTION OF THE PREFERRED EMBODIMENTS

Figure 8:
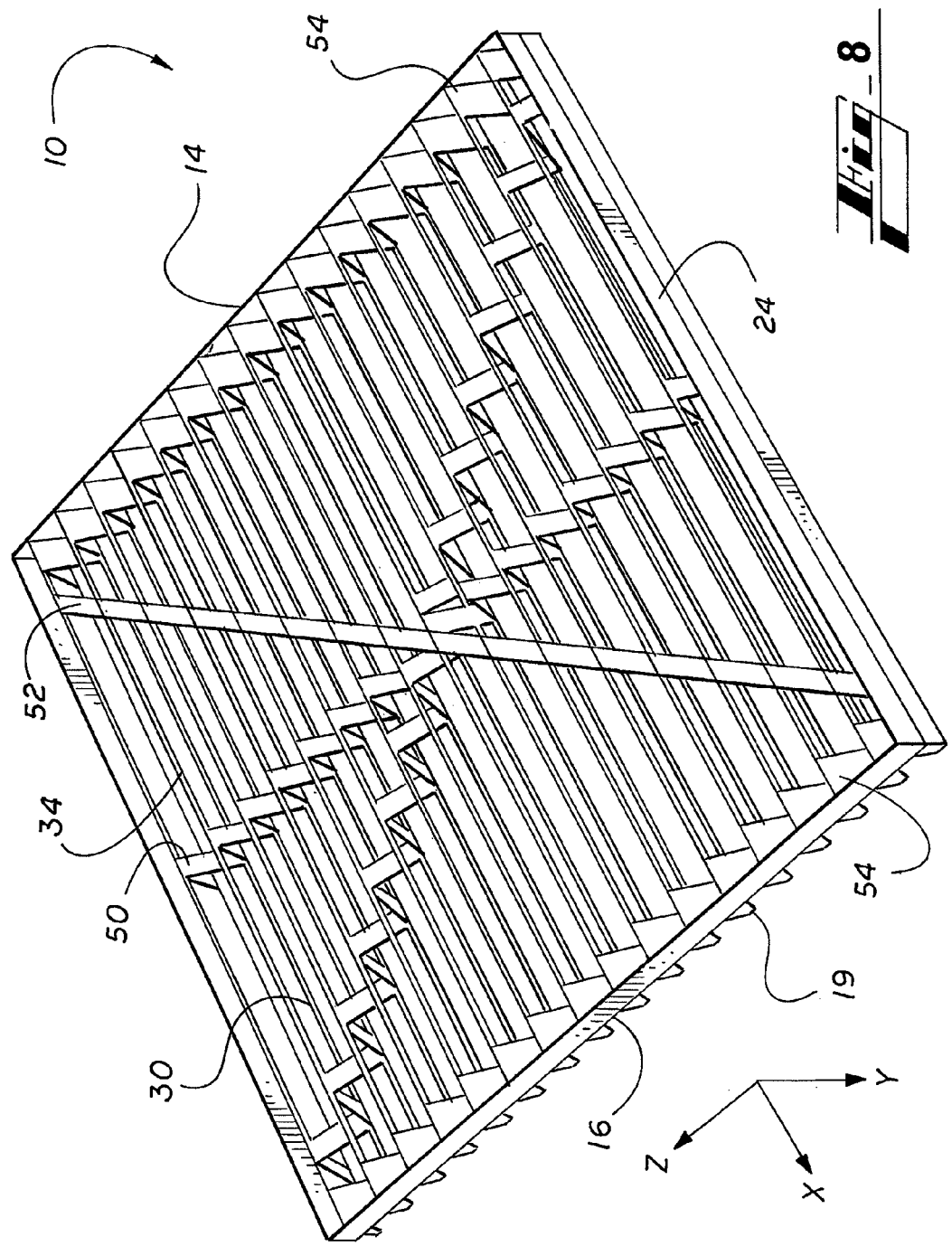
FIG. 8 is a bottom perspective view of the first embodiment of the pleated filter in accordance with the present invention with the filter media removed in order to show the details of the skeletal structure of the filter frame.

Pleated filters or other three-dimensional filters in accordance with the present invention may include a variety of fluid (gas and liquids) filters, including without limitation HVAC air filters, oil filters, automobile air and cabin filters, industrial intake air filters, water filters, etc. A first embodiment of a pleated filter 10, in accordance with the present invention, is shown in FIGS. 1-8 and 11. The pleated filter 10 comprises a filter frame 12 and a filter media 40 with linear pleats 42. The filter media 40 is attached to the filter frame 12, and the filter frame 12 supports and holds the filter media 40 in its pleated configuration. The pleated filter 10 may be employed as fluid filter in a variety of environments. In one environment, the pleated filter 10 is used as a return air filter for an HVAC system (not shown).

The filter media 40 for the pleated filter 10 may comprise a variety filter media for filtering air, other gases, or fluids. The filter media 40 comprises a flexible nonwoven material, including without limitation thermoplastic, thermoset, micro glass, paper, or fiberglass materials. The filter media 40 may also include composites of fiberglass and nonwoven thermoplastic materials, including, but not limited to, polypropylene, polyester, and polyethylene materials. The composition and filtering characteristics of the filter media 40 are not critical to the present invention. With respect to the present invention, the filter media 40 only needs to be constructed so that the filter media 40 can be formed into a pleated or other three-dimensional shape, such as with linear pleats 42. With respect to the term pleated, pleated should be understood to be any pleated configuration for the filter media that includes not only linearly extending pleats 42 shown in FIGS. 1-8 and 11, but also includes any undulating three-dimensional configuration with three-dimensional peaks and valleys extending along the y-axis, for example, triangular shaped peaks and valleys, egg shaped peaks and valleys, conical shaped peaks and valleys, and any other three-dimensional undulating configuration with peaks and valleys. See for example FIG. 33. The filter frame 12 may be constructed of any formable material including without limitation thermoplastic materials (e.g. polypropylene, polyester, and polyethylene), thermoset materials, or molded cardboard.

The pleated filter 10, as shown in FIGS. 1-8 and 11, has a generally rectangular filter frame 12 with coordinates x, y, and z shown in FIGS. 1-8 and 11. The periphery of the filter frame 12 and the resulting pleated filter 10, however, may be of any geometric shape in order to conform to the environment and application for which the pleated filter 10 is intended. The filter frame 12 can be formed from a variety of thermoplastic or thermoset materials that can be molded, extruded, stamped, or thermoformed.

As shown in FIGS. 1-8 and 11, the filter frame 12 comprises end walls 14, side walls 24, and a skeletal structure 26 connected to the end walls 14 and the side walls 24 and occupying the space between the end walls 14 and the side walls 24. The skeletal structure 26 provides support for the pleated shape of the filter media 40. In the embodiment shown in FIGS. 1-8 and 11, the skeletal structure 26 includes peak ribs 30 and valley ribs 34 that extend in the x-direction, generally parallel to each other, and between the end walls 14 (FIG. 7). The peak ribs 30 and the valley ribs 34 are offset in the y-direction from each other to define linear peaks 28 and linear valleys 32 of the linear pleated skeletal structure 26 (FIG. 1). The skeletal structure 26 in the first embodiment further includes pleated end bands 54 and one or more intermediate pleated bands 50 that extend in the z-direction between the side walls 24 of the filter frame 12 and perpendicular to the linear direction (x-direction) of the pleats 42 of the pleated filter media 40. Additional diagonal pleated bands 52 may be provided that extend diagonally across the filter frame 12. The intermediate pleated bands 50, the pleated end bands 54, and the diagonal pleated bands 52 of the skeletal structure 26 interconnect the peak ribs 30 and the valley ribs 34 in order to maintain separation, in the y-direction, between the peak ribs 30 and the valley ribs 34 and to reinforce the peak ribs 30 and the valley ribs 34. The intermediate pleated bands 50, the pleated end bands 54, and the diagonal pleated bands 52 of the skeletal structure 26 also engage the filter media 40 directly to maintain the pleated shape of the filter media 40.

Figure 11:
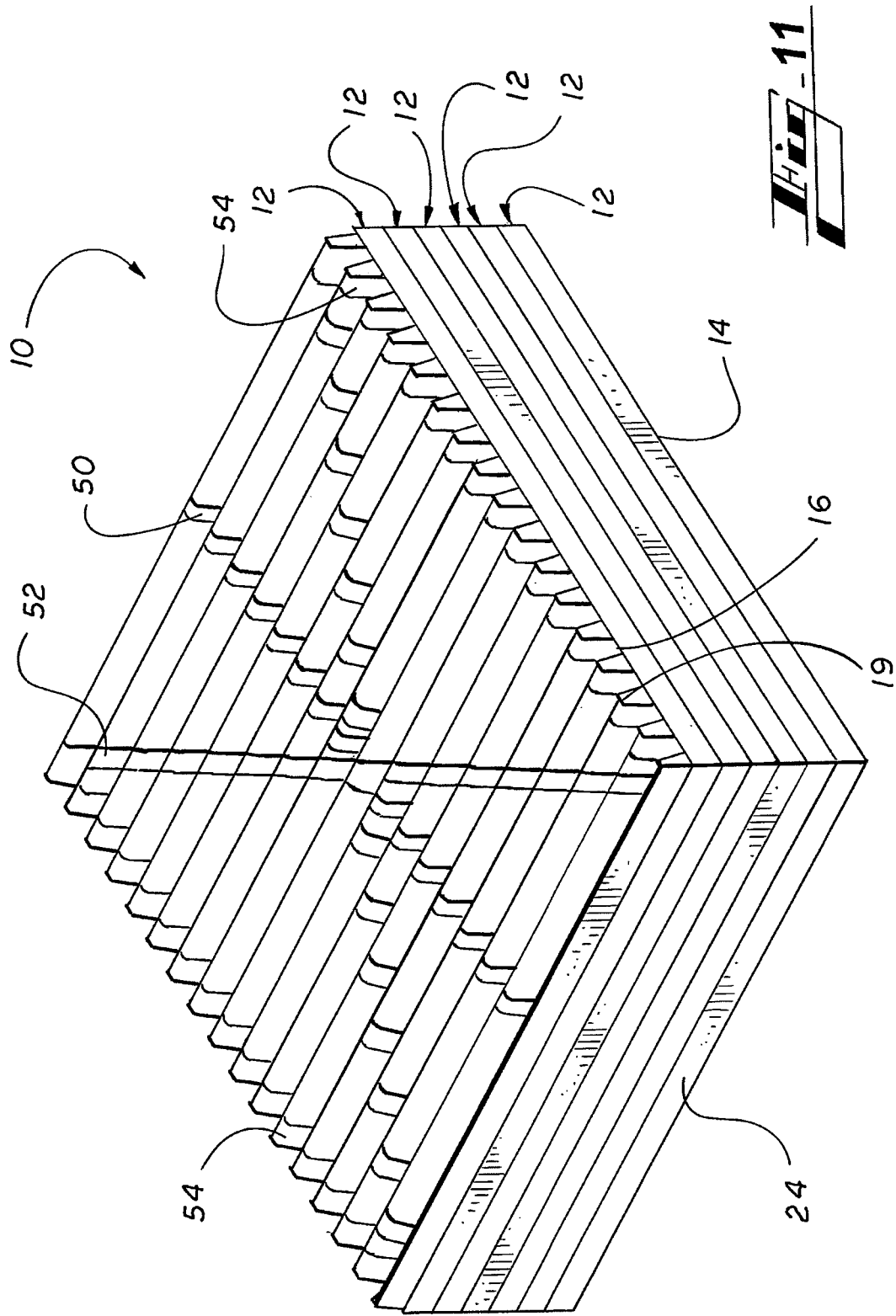
FIG. 11 is a top perspective view of the first embodiment of the pleated filter in accordance with the present invention with the filter media attached to the skeletal structure of the filter frame and showing a nested stack of the pleated filters.

With reference to FIGS. 1 and 3, each of the side walls 24 of the filter frame 12 comprises an upper planar portion 23 and a lower planar portion 25. The lower planar portion 25 provides the basic structure for the side walls 24, and the upper planar portion 23 engages and connects the filter media 40 to the side walls 24. With reference to FIGS. 1 and 4, each of the end walls 14 comprises a lower planar portion 17 from which end wall peaks 19 protrude. The end wall peaks 19 connect to and close the open ends of the pleated end bands 54. Notches 16 are formed between the end wall peaks 19. The notches 16 along with the valleys 32 of the linear pleats 42 allow the pleated filters 10 to be nested and thereby stacked as shown in FIG. 11. As a result of the nested configuration, the pleated filters 10 of the present invention occupy less space for packaging, shipping, and storage than required for ordinary pleated filters with flat cardboard or beverage board frames.

The peaks 28 and the valleys 32 in the skeletal structure 26 are illustrative of a linear configuration of linear pleats 42. One of ordinary skill in the art will understand that in the construction of a filter frame, such as filter frame 12 with a pleated skeletal structure, such as skeletal structure 26, the term pleated should be understood to include not only linearly extending pleats (FIGS. 1-8 and 11), but also to include any three-dimensional undulating configuration with peaks and valleys, for example, triangular shaped peaks and valleys, spherical shaped peaks and valleys, egg shaped peaks and valleys, conical shaped peaks and valleys, and any other three-dimensional undulating configuration with peaks and valleys extending in the y-direction. For example, FIG. 33 shows a three-dimensional filter 1110 comprising end walls 1114, side walls 1124, and a skeletal structure (not shown) that supports a filter media 1140. Particularly, the skeletal structure produces conical shaped peaks 1128 and planar valleys 1132 in the filter media 1140. Because the conical shaped peaks 1128 extend above the height of the end walls 1114 and side walls 1124, the three-dimensional filter 1110 is nestable in order to conserve space in packaging, shipping, and storing the filter 1110.

Figure 9:
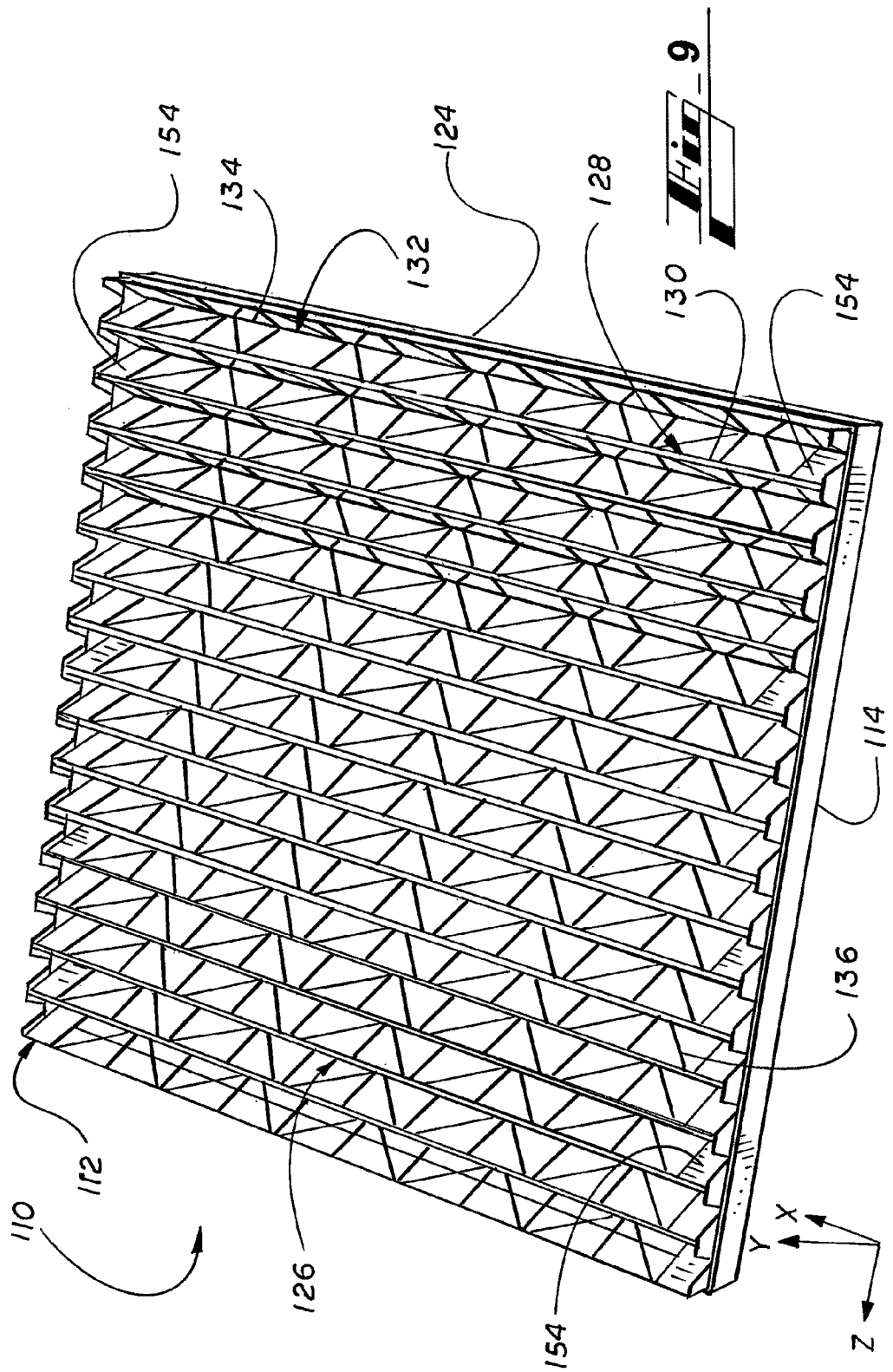
FIG. 9 is a top perspective view of a second embodiment of the pleated filter in accordance with the present invention with the filter media removed in order to show the details of the skeletal structure of the second embodiment of the filter frame.
Figure 10:
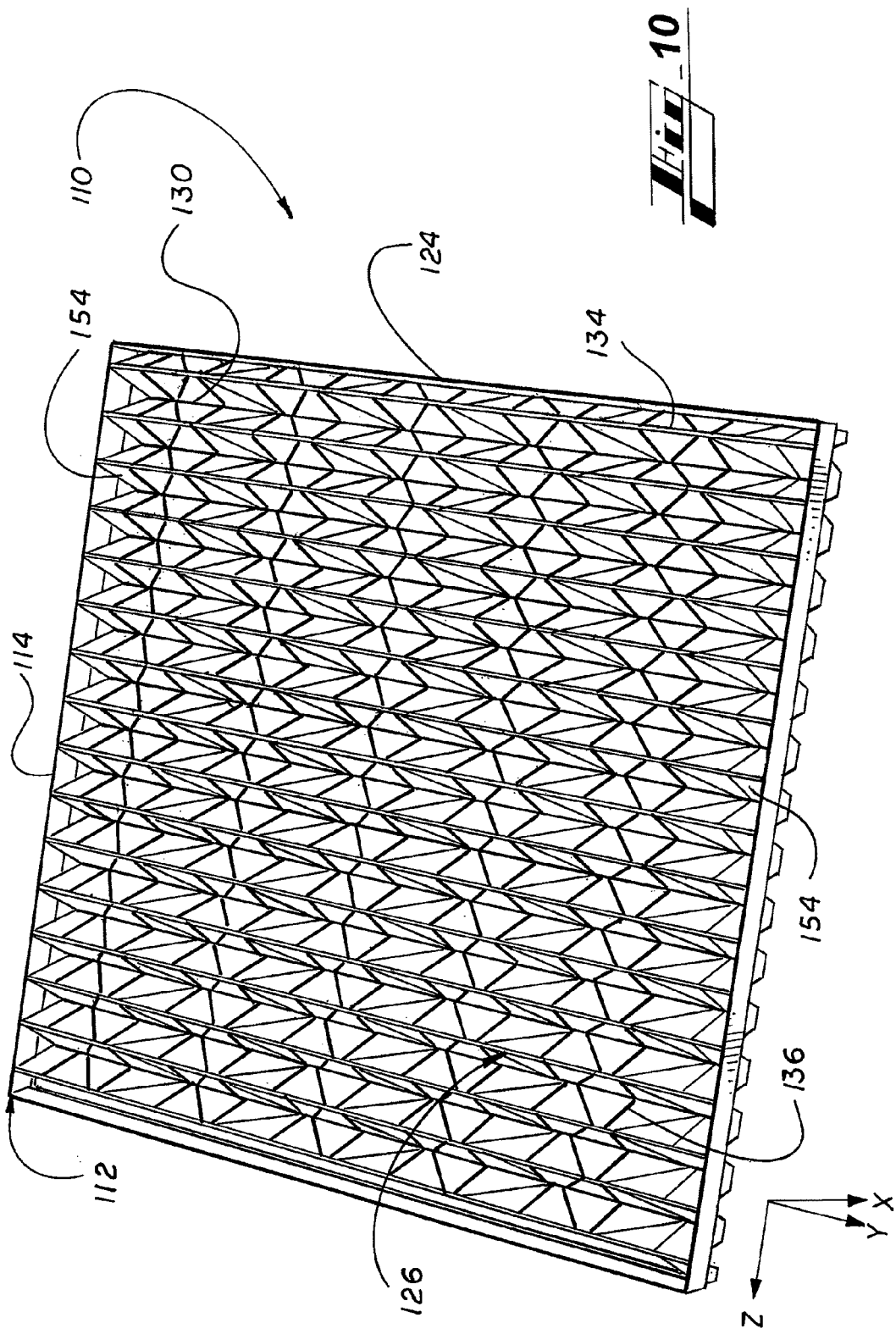
FIG. 10 is a bottom perspective view of the second embodiment of the pleated filter in accordance with the present invention with the filter media removed in order to show the details of the skeletal structure of the second embodiment of the filter frame.

As shown in FIGS. 9 and 10, a second embodiment of a filter frame 112 (with the filter media removed for clarity) comprises end walls 114, side walls 124, and a skeletal structure 126. The filter frame 112 has linear peaks 128 and linear valleys 132 extending between the end walls 114. Particularly, peak ribs 130 extend between the end walls 114 and form the linear peaks 128, and valley ribs 134 extend between the end walls 114 and form the linear valleys 132. The peak ribs 130 and the valley ribs 134 are connected to the end walls 114 by means of reinforcing pleated end bands 154. The peak ribs 130 and the valley ribs 134 are interconnected by a series of interlacing rib supports 136 that maintain the spacing between the peak ribs 130 and the valley ribs 134 in the y-direction. The rib supports 136 may take a variety of configurations including a number of small interlacing members 136 such as that shown in FIGS. 9 and 10. In addition, the small interlacing members 136 between the peak ribs 130 and the valley ribs 134 for maintaining spacing in the y-direction may be replaced by a perforated web of a thermoplastic material with a series of holes or by a web of thermoplastic materials constituting a mesh. Alternatively, the peak ribs 30 and 130 and the valley ribs 34 and 134 may be of sufficient size and strength so that no rib supports such as interlacing members 136 (FIGS. 9 and 10) or intermediate bands 50 or 52 (FIG. 7) are required for interconnecting the peak ribs 30 and 130 and the valley ribs 34 and 134.

Figure 12:
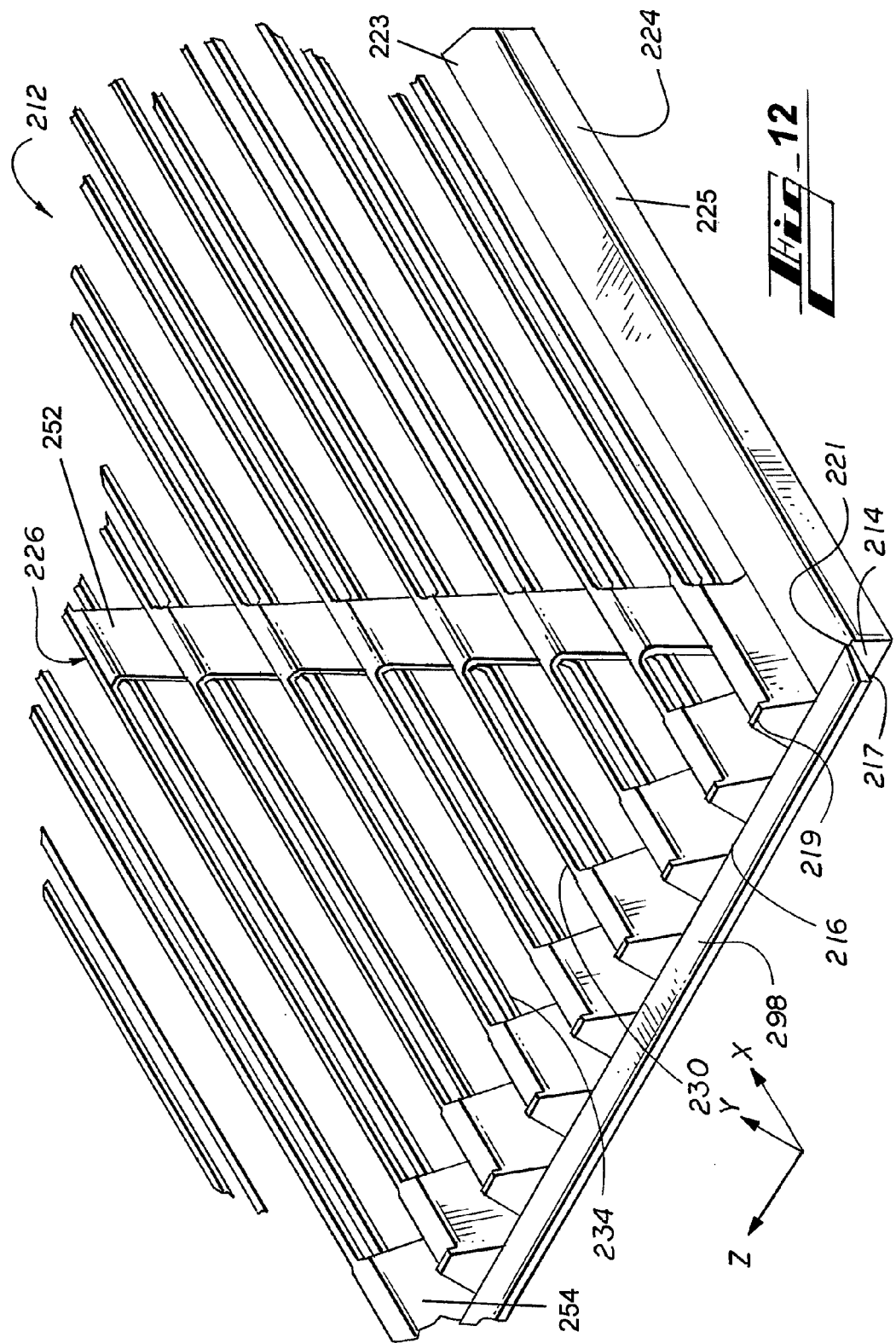
FIG. 12 is a detailed top perspective view of a third embodiment of a pleated filter in accordance with the present invention with the filter media removed from the skeletal structure of the filter frame and showing a hinged end baffle in a position for stacking the pleated filter.
Figure 13:
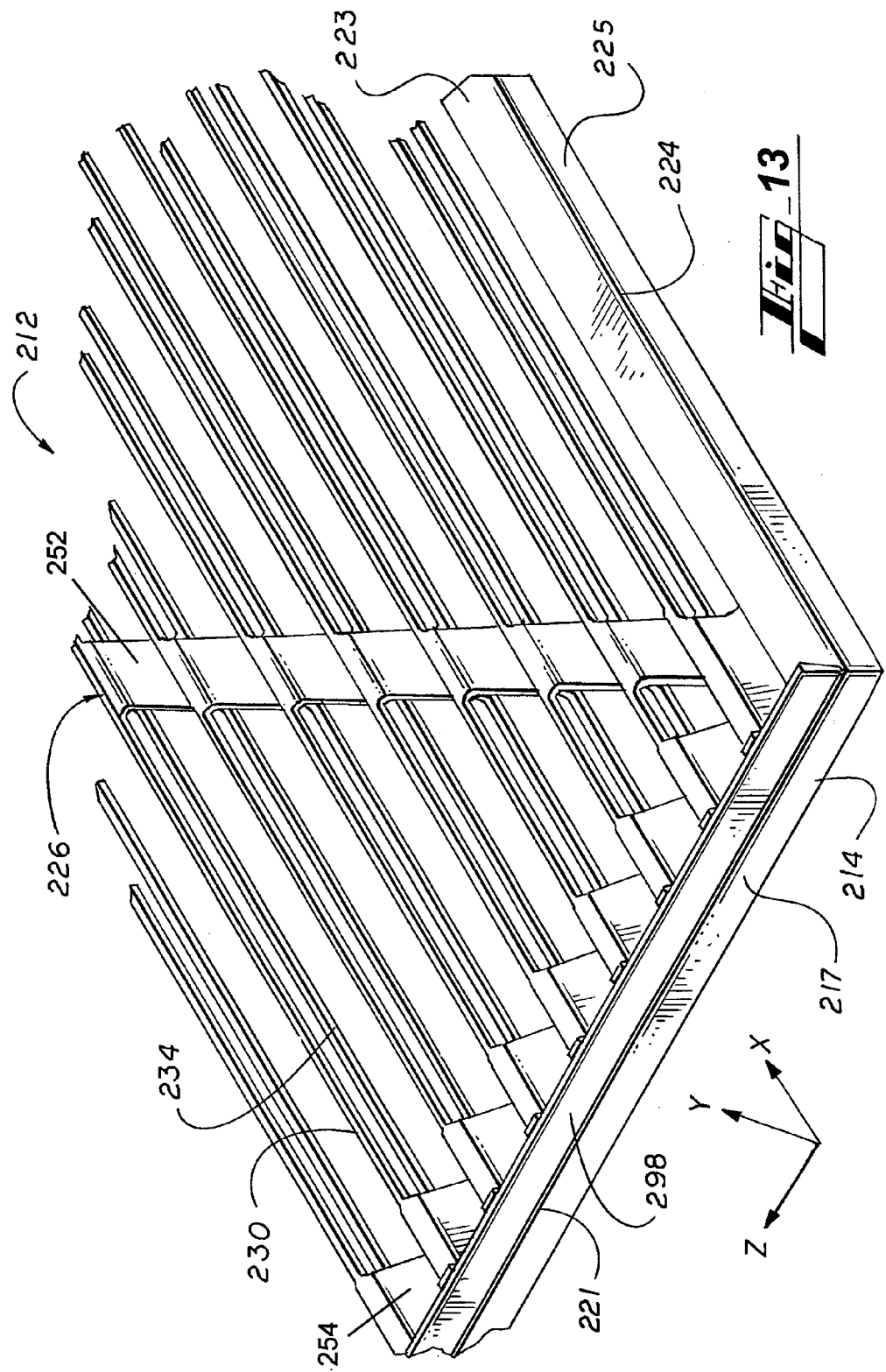
FIG. 13 is a detailed top perspective view of the third embodiment of the pleated filter in accordance with the present invention with the filter media removed from the skeletal structure of the filter frame and showing the hinged baffle in a position for use of the pleated filter.
Figure 14:
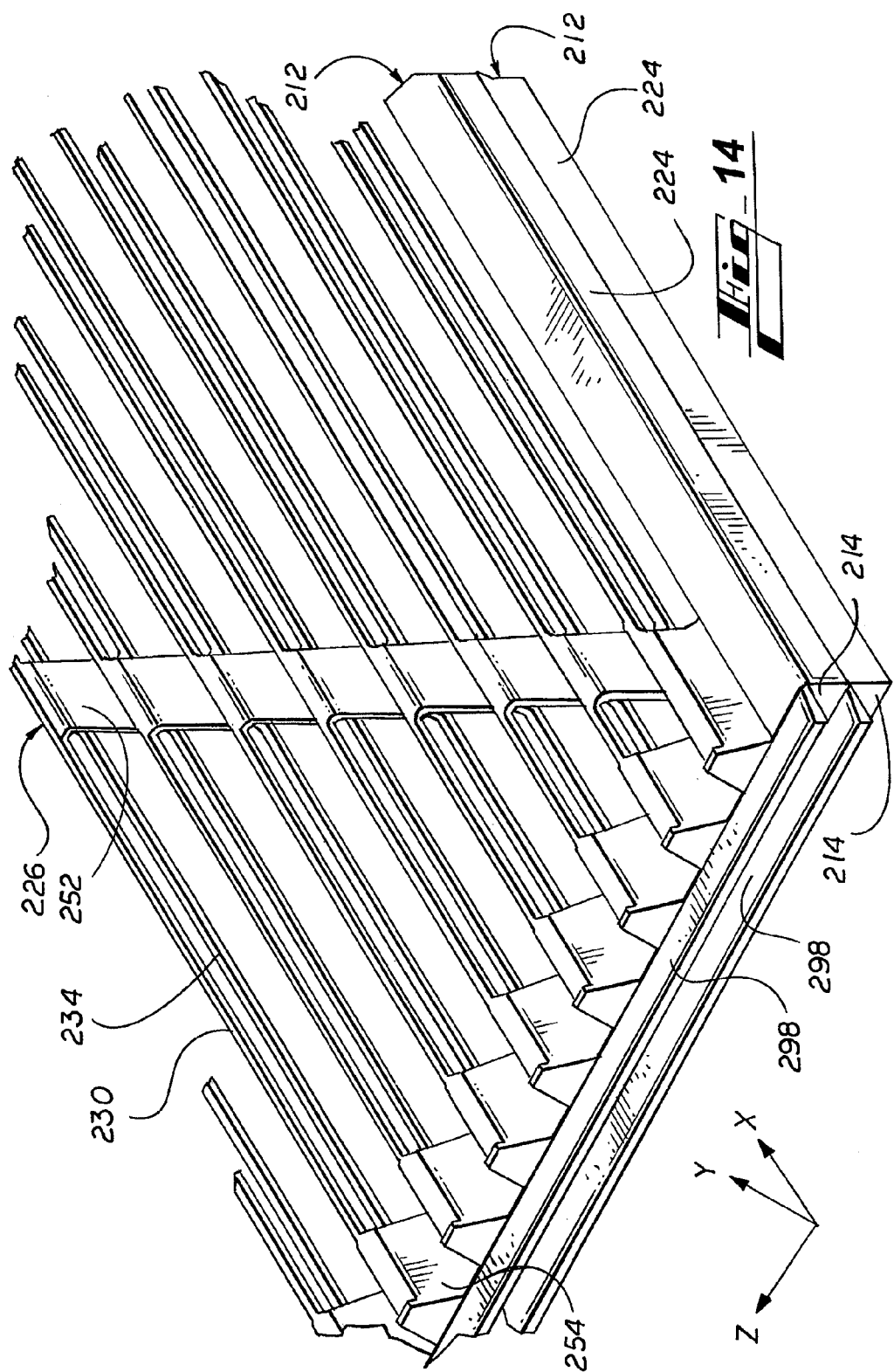
FIG. 14 is a detailed top perspective view of the third embodiment of the pleated filter in accordance with the present invention with the filter media removed from the skeletal structure of the filter frame and showing a stack of the pleated filters with the hinged end baffle in the position for stacking the pleated filters.

FIGS. 12-14 show a third embodiment of a filter frame 212. The filter frame 212 is rectangular in shape and is similar in construction to the first embodiment of the filter frame 12 with the pleated bands 50, 52, and 54 previously described. Particular, the filter frame 212 comprises end walls 214, side walls 224, and a skeletal structure 226 connected to the end walls 214 and the side walls 224 and occupying the space between the end walls 214 and the side walls 224. The skeletal structure 226 provides support for the pleated shape of the filter media (removed for clarity). The skeletal structure 226 includes peak ribs 230 and valley ribs 234 that extend in the x-direction, generally parallel to each other, and between the end walls 214. The peak ribs 230 and the valley ribs 234 are offset in the y-direction from each other to define linear peaks 228 and linear valleys 232 of the linear pleated skeletal structure 226. The skeletal structure 226 further includes pleated end bands 254 and one or more intermediate pleated bands (not shown) that extend in the z-direction between the side walls 224 of the filter frame 212 and perpendicular to the linear direction (x-direction) of the peak ribs 230 and the valley ribs 234 of the filter frame 212. Additional diagonal pleated bands, such as diagonal pleated bands 252, may be provided that extend diagonally across the filter frame 212. The intermediate pleated bands, the pleated end bands 254, and the diagonal pleated bands 252 of the skeletal structure 226 interconnect the peak ribs 230 and the valley ribs 234 in order to maintain separation, in the y-direction, between the peak ribs 230 and the valley ribs 234 and to reinforce the peak ribs 230 and the valley ribs 234. The intermediate pleated bands, the pleated end bands 254, and the diagonal pleated bands 252 of the skeletal structure 226 also engage the filter media (removed for clarity) directly to maintain the pleated shape of the filter media.

With reference to FIGS. 12 and 13, each of the side walls 224 of the filter frame 212 comprises an upper planar portion 223 and a lower planar portion 225. The lower planar portion 225 provides the basic structure for the side walls 224, and the upper planar portion 223 engages and connects the filter media 240 to the side walls 224. With continuing reference to FIGS. 12 and 13, each of the end walls 214 comprises a lower planar portion 217 from which end wall peaks 219 protrude in the y-direction. The end wall peaks 219 connect to and close the open ends of the pleated end bands 254. Notches 216 are formed between the end wall peaks 219. With reference to FIGS. 12, 13, and 14, a baffle 298 is hinged to end wall 214 at the intersection 221 of the lower planar portion 217 and the end wall peaks 219. The baffle 298 extends along the length of the end wall 214. In FIG. 13, the baffle 298 is in a raised/closed position so that it seals the ends of the notches 216 at the end of the valleys 232 when the filter is positioned in a structure for use. An adhesive or a mechanical fastener may be used to hold the baffle 298 in the raised position and in contact with the end wall peaks 219. In the raised/closed position, the baffle 298 thereby seals the ends of the filter frame 212 so that air cannot leak around the open ends of the notches 216. In FIGS. 12 and 14, the baffle 298 is a lowered/stacking position so that the ends of the notches 216 along with the valleys 232 of the linear pleats 242 are open, and consequently the pleated filters can be nested and stacked as shown in FIG. 14. As a result of the nested configuration, the pleated filters of the present invention occupy less space for packaging, shipping, and storage than required for ordinary pleated filters with flat cardboard or beverage board frames.

Figure 15:
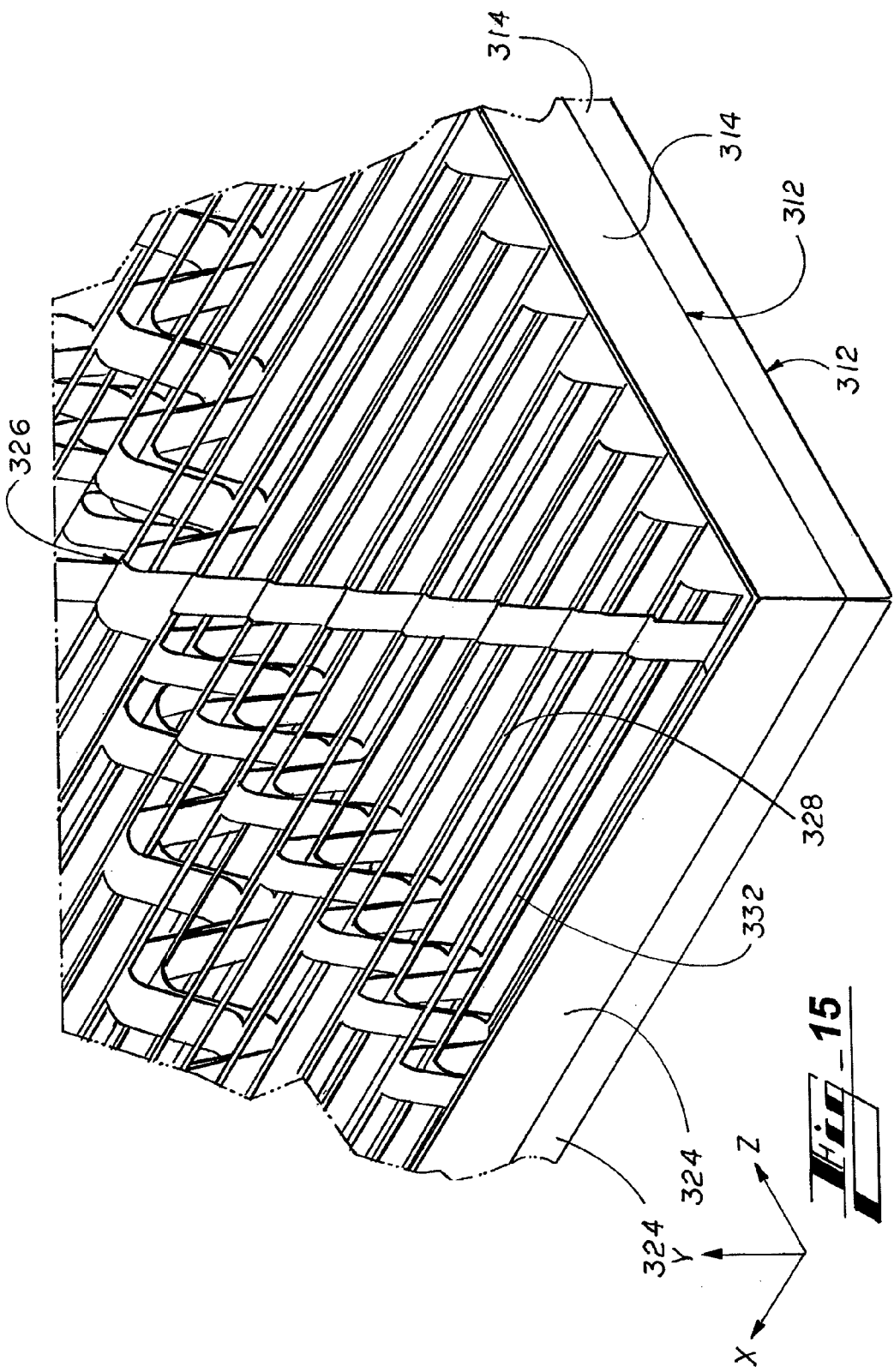
FIG. 15 is a detailed top perspective view of a fourth embodiment of a pleated filter in accordance with the present invention with the filter media removed from the skeletal structure of the filter frame and showing a nested stack of the pleated filters with drafted (flared) side walls and end walls.

FIG. 15 discloses a stack of alternative filter frames 312. Each filter frame 312 is rectangular in shape and comprises end walls 314, side walls 324, and a skeletal structure 326. The filter medium is removed from the filter frame 312 for the purposes of clarity. The skeletal structure 326 is in all material respects the same as the skeletal structure 26 previously described with respect to the first embodiment of the pleated filter 10 shown in FIGS. 1-8. The end walls 314 and the side walls 324 are sufficiently wide to extend in the y-direction from the bottom of the filter frame 312 to the top of peaks 328 of the skeletal structure. Particularly, with respect to the end walls 314, the end walls 314 seal notches 316 at the ends of valleys 332 of the skeletal structure 326 so that air cannot leak around the skeletal structure at the ends of the valleys 332. In addition, the end walls 314 and the side walls 324 are flared outwardly at the bottom of the filter frame 312. Consequently, because of the flare, the filter frames 312 can be nested as shown in FIG. 15 to conserve space for packaging, shipping, and storage.

Figure 16:
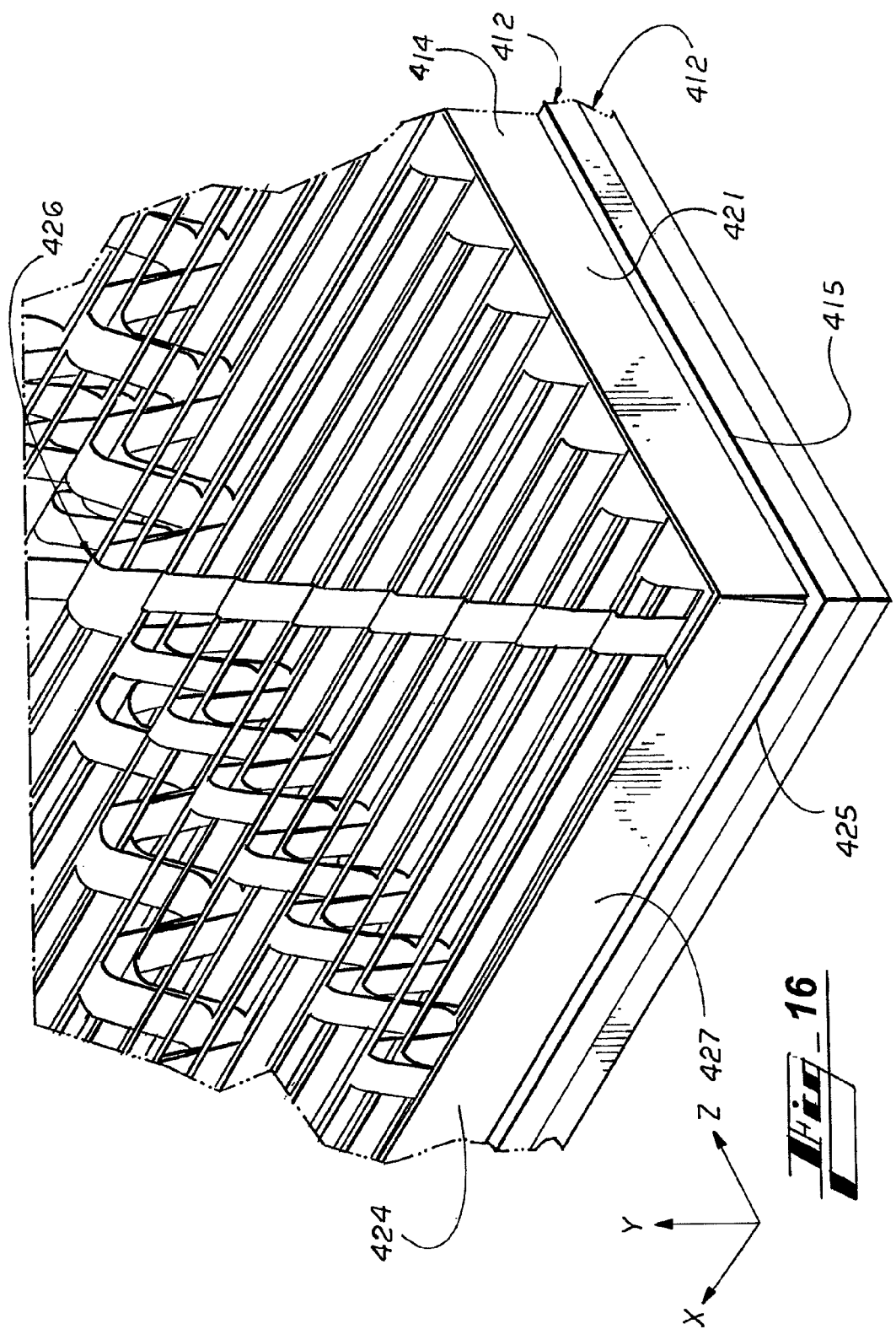
FIG. 16 is a detailed top perspective view of the fifth embodiment of the pleated filter in accordance with the present invention with the filter media removed from the skeletal structure of the filter frame and showing a nested stack of the pleated filters with drafted (flared) and stepped side walls and end walls for stacking the pleated filter.

FIG. 16 discloses a stack of alternative filter frames 412. Each filter frame 412 is rectangular in shape and comprises end walls 414, side walls 424, and a skeletal structure 426. The filter medium is removed from the filter frame 412 for the purposes of clarity. The skeletal structure 426 is in all material respects the same as the skeletal structure 26 previously described with respect to the first embodiment of the pleated filter 10 shown in FIGS. 1-8. The end walls 414 and the side walls 424 include stepped portions 415 and 425 respectively and upper portions 421 and 427 respectively. The upper portions 421 and 427 are sufficiently wide to extend in the y-direction from the bottom of the filter frame 312 to the top of peaks 428 of the skeletal structure. Particularly, with respect to the end walls 414, the upper portion 421 of the end walls 414 seal notches 316 at the ends of valleys 432 of the skeletal structure 426 so that air cannot leak around the skeletal structure at the ends of the valleys 432. In addition, the upper portions 421 of the end walls 414 and the upper portions 427 of the side walls 424 are flared outwardly adjacent the stepped portions 415 and 425 of the filter frame 412. Consequently, because of the flare, the filter frames 412 can be nested as shown in FIG. 16 to conserve space for packaging, shipping, and storage.

FIGS. 34-40 illustrate a filter frame 1012 for a stackable pleated filter in accordance with the present invention. The pleated filter frame 1012 shown in FIGS. 24-40 can also be trimmed to accommodate certain standard widths for pleated filters. Particularly, FIGS. 34-40 show the filter frame 1012 for a pleated filter with the filter media removed for the purpose of clarity.

As shown in FIGS. 34-40, the filter frame 1012 has a generally rectangular shape. The filter frame 1012 comprises end walls 1014, side walls 1024, and a skeletal structure 1026 connected to the side walls 1024 and to the end walls 1014 (as more fully described below). The skeletal structure 1026 occupies the space between the end walls 1014 and the side walls 2024. The skeletal structure 1026 provides support for the pleated shape of the filter media. The skeletal structure 1026 includes peak ribs 1030 and valley ribs 1034 that extend in the x-direction, generally parallel to each other, and between the end walls 1014. The peak ribs 1030 and the valley ribs 1034 are offset in the y-direction from each other to define linear peaks 1028 and linear valleys 1032 of the pleated skeletal structure 1026 (FIG. 40). The skeletal structure 1026 includes pleated end bands 1054 and intermediate pleated bands 1050 and 1051 that extend in the z-direction between the side walls 1024 of the filter frame 1012 and perpendicular to the linear direction (x-direction) of the peak ribs 1030 and the valley ribs 1034. The intermediate pleated bands 1050 and 1051 and the pleated end bands 1054 of the skeletal structure 1026 interconnect the peak ribs 1030 and the valley ribs 1034 in order to maintain separation, in the y-direction, between the peak ribs 1030 and the valley ribs 1034 and to reinforce the peak ribs 1030 and the valley ribs 1034. The intermediate pleated bands 1050 and 1051 and the pleated end bands 1054 of the skeletal structure 1026 also engage the filter media directly to maintain the pleated shape of the filter media.

As shown in FIGS. 37-39, each of the side walls 1024 of the filter frame 1012 comprises an upper planar portion 1023 and a lower planar portion 1025. The lower planar portion 1025 provides the basic structure for the side walls 1024, and the upper planar portion 1023 engages and connects the filter media to the side walls 1024.

As best shown in FIG. 40, the pleated end band 1054 conforms to the peaks 1028 and the valleys 1032 adjacent the end wall 1014. The pleated end band 1054 terminates in a continuous serpentine tab 1055. During shipping and prior to use, the end wall 1014 is connected to the skeletal structure 1026 by means of hinges 1021. The hinges 1021 connect two or more of the peaks 1028 of the end band 1054 to an edge 1023 of the end wall 1014. The hinges 1021 constitute a thin web of flexible material between the edge 1023 of the end wall 1014 and two or more of the peaks 1028 of the end band 1054. An inside surface 1029 of the end wall 1014 has a serpentine pattern of parallel ridges 1031 and 1033 that form a continuous serpentine slot 1035.

Figure 34:
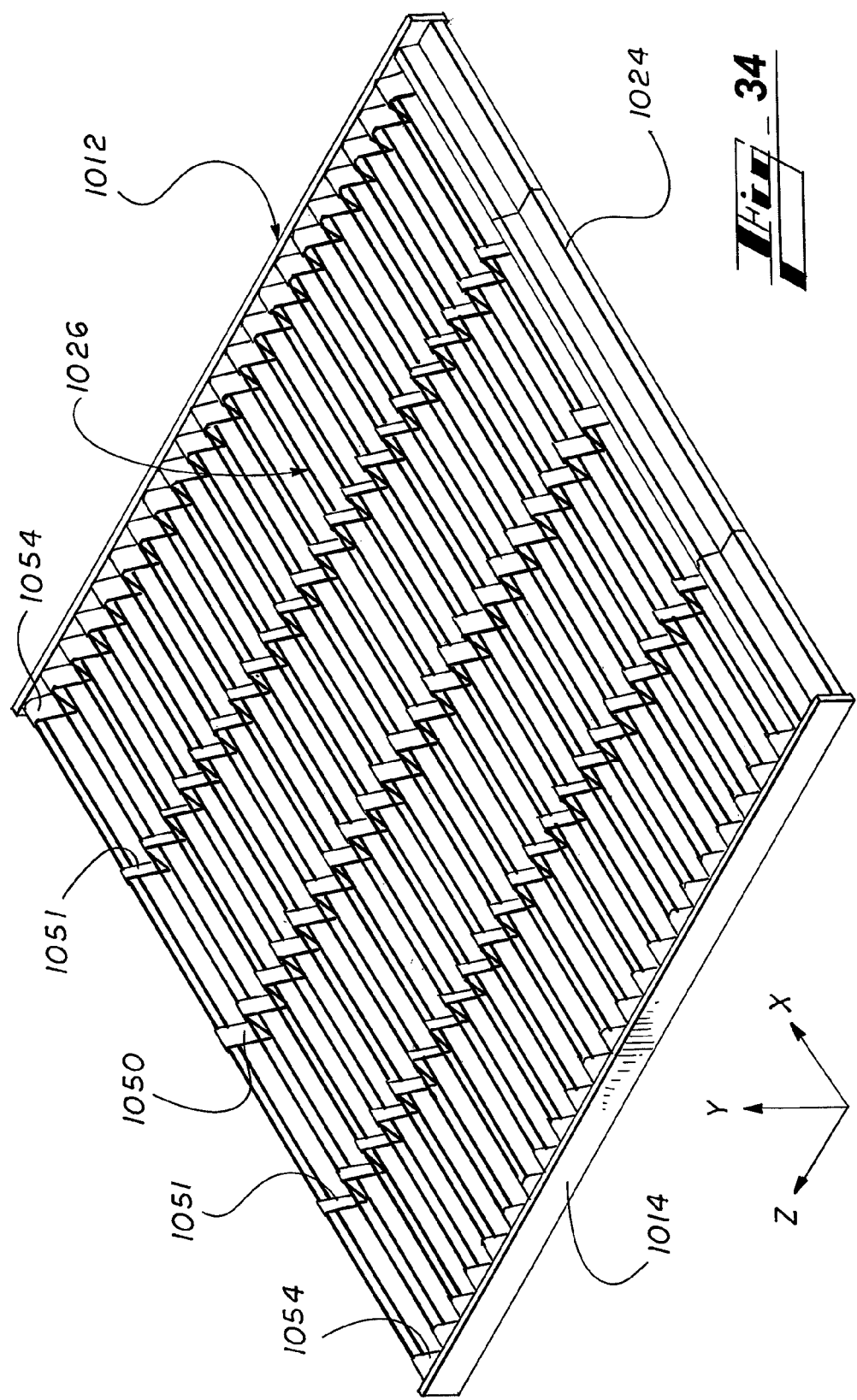
FIG. 34 is a top perspective view of a seventh embodiment of a pleated filter in accordance with the present invention with the filter media removed from the skeletal structure of the filter frame for clarity and showing hinged end walls in a closed position.

When the end wall 1014 is in its closed position for use, as shown in FIGS. 34, 37, and 38, the serpentine slot 1035 of the end wall 1014 engages the corresponding serpentine tab 1055 of the pleated end band 1054 to connect the end wall 1014 to the pleated end band 1054. Other fasteners may be employed to secure the end wall 1014 to the ends of the pleated end band 1054. In the closed position, the end wall 1014 closes the ends of the peaks 1028 and valleys 1032 of the skeletal structure 1026 to keep air from escaping around the ends of the peaks 1028 and the valleys 1032.

When the end wall 1014 is in its open position during shipping and prior to use, as shown in FIGS. 35, 36, 39, and 40, the pleated filters constructed using the filter frame 1012 can be nested and thereby stacked. As a result of the nested configuration, the pleated filters, constructed using filter frame 1012 of the present invention, occupy less space for packaging, shipping, and storage than required for ordinary pleated filters with flat cardboard or beverage board frames.

The filter frame 1012 may also be trimmed to accommodate standard sizes required for the pleated filter of the present invention. Particularly with respect to the width (x-direction) of the filter frame 1012, the intermediate pleated bands 1051 have serpentine tabs 1057 (FIGS. 37, 38, 39 and 40). With reference to FIG. 37, the width of the filter frame 1012 may be trimmed by cutting the side wall 1024 at outline or perforation line 1059, by cutting each of the of peak ribs 1030 at outlines or perforation lines 1061, and by cutting each of the valley ribs 1034 at outlines or perforation lines 1063. Once the side walls 1024, the peak ribs 1030, and the valley ribs 1034 have been cut, the serpentine tab at 1057 is exposed and forms the outer end of the intermediate pleated band 1051. The end wall 1024 can then be detached from the peaks 1028 of the pleated end band 1054 by breaking the hinge 1021. Once separated from the pleated end band 1054, the end wall 1014 can be reinstalled onto the intermediate pleated band 1051 by engaging the serpentine slot 1035 onto the serpentine tab 1057 of the intermediate pleated band 1051.

With respect to altering the length (z-direction) of the filter frame 1012, the filter frame 1012 can be cut along the peak ribs 1030 or along the valley ribs 1034 to create a straight edge defined by either one of the peak ribs 1030 or by one of the valley ribs 1034. The straight edge thus constitutes a side wall 1024. Once the filter frame 1012 is has been cut to length, the end wall 1014 can be trimmed to length to match the length of the filter frame 2012. With the filter frame 1012 cut to length and the end wall 1014 cut to length to match, the end wall 1014 is attached to the serpentine tab 1055 or serpentine tab 1057 depending on whether the width of the filter frame 2012 has been altered.

The pleated filter 10 of the present invention can be fabricated in a variety of ways. For example, the pleated filter 10 with the filter frame 12 and skeletal structure 26 can be fabricated by injection molding, thermoforming, extrusion/needle punching, or heat molding in situ. FIGS. 17-19 show three steps of an injection molding process for making the pleated filter 10 of the present invention. The injection molding process illustrated by FIGS. 17-19 is implemented by an injection molding system 58 that includes an injection molding station 80 and a filter media pickup station 82. The injection molding station 80 includes an injection mold 60 having a movable half mold section 62 and a stationary half mold section 64 with an injection unit 66 operatively connected thereto for injecting molten thermoplastic material into the mold 60. The movable half mold section 62 has a pattern that conforms to the linear pleats for the finished pleated filter 10. The stationary half mold section 64 has a pattern that conforms to the skeletal structure 26 of the pleated filter 10. The media pickup station 82 includes a shear 76 that cuts a continuous web of filter media 74 into individual pieces 78 of the filter media 74. The individual filter media pieces 78 are disposed in a stack 79 at the pickup station 82. An articulating pickup arm 70 is mounted for movement along a stationary beam 68. The articulating pickup arm 70 includes an articulating pickup head 72 that is capable of capturing and lifting each individual filter media piece 78 from the filter media stack 79. For example, the pickup head 72 may employ suction to capture and hold the individual filter media pieces 78.

As shown in FIG. 17, the mold 60 is closed having just completed molding a pleated filter 10 (FIG. 18), but the mold 60 has not yet opened to release the recently fabricated pleated filter 10. The articulating pickup arm 70 is positioned along the stationary beam 68 so that the articulating pickup head 72 is positioned over the filter media stack 79 of individual filter media pieces 78, and the pickup head 72 has captured an individual filter media piece 78 on the top of the filter media stack 79.

As shown in FIG. 18, the mold 60 has opened to discharge the recently formed pleated filter 10. The articulating pickup arm 70, with the captured individual filter media piece 78, has moved from a position adjacent the filter media stack 79 to a position adjacent the injection mold 60. The articulating pickup head 72 of the articulating pickup arm 70 has repositioned the captured individual filter media piece 78 so that the captured filter media piece 78 is in a vertical orientation prior to insertion between the open mold sections 62 and 64. FIG. 19 shows the captured individual filter media piece 78 inserted between the mold sections 62 and 64 of the mold 60 prior to release from the articulating pickup head 72 of the articulating pickup arm 70 and before the mold sections 62 and 64 close. The articulating pickup arm 70 deposits the filter media piece 78 in the cavity of the mold section 64, and the filter media piece 78 is retained in the mold section 64 by electrostatic charge, by protruding pins, by a vacuum, by gripping, by pinching, by wedging, by tucking, by clamping is, etc. Once the filter media piece 78 has been deposited in the cavity of the mold section 64, the mold sections 62 and 64 close, and the injection unit 66 injects the thermoplastic material into the mold 60 to form the filter frame 12 with its skeletal structure 26 in contact with the filter media piece 78. Because the thermoplastic material is in a molten state when injected into the mold 60, the hot skeletal structure 26 adheres to the filter media piece 78 as the thermoplastic material cools.

FIGS. 20-22 show three steps of an injection molding process that is illustrative of a second method in accordance with the present invention. The process illustrated by FIGS. 20-22 is implemented by an injection molding system 88 that includes an injection molding station 81 and a filter media feeding station 90. The molding station 81 includes an injection mold 61 having a movable half mold section 63 and a stationary half mold section 65 with an injection unit 67 operatively connected thereto for injecting molten thermoplastic material into the mold 61. The movable half mold section 63 has a pattern that conforms to the linear pleats for the finished pleated filter 10. The stationary half mold section 65 has a pattern that conforms to the skeletal structure 26 of the pleated filter 10. The filter media feeding station 90 includes a filter media supply roll 84 and a selvage take-up roll 86. A web of filter media 85 is unwound from the filter media supply roll 84. The web of filter media 85 has a selvage edge 92 that extends outside of the edges of the mold cavities of the mold sections 63 and 65. The selvage take-up roll 86 draws the web of filter media 85 between the mold sections 63 and 65 by means of the selvage edge 92 of the web of filter media 85.

As shown in FIG. 20, the mold 61 is open so that the selvage take-up roll 86 can draw the filter media 85 from the filter media supply roll 84 into the space between the mold sections 63 and 65 in anticipation of the next molding process. Once the web of filter media 85 is positioned between the mold sections 63 and 65, the mold sections 63 and 65 close as shown in FIG. 21. As the mold sections 63 and 65 close, the mold sections 63 and 65 sever a portion of the filter media from the web of filter media 85 leaving the selvage edge 92 intact. The injection unit 67 then injects the thermoplastic material into the closed mold 61 to form the filter frame 12 with its skeletal structure 26 in contact with the filter media 85. Because the thermoplastic material is in a molten state when injected into the mold 61, the hot skeletal structure 26 adheres to the filter media 85 as the thermoplastic material cools. As shown in FIG. 22, the mold 61 is opened after the injection molding process is completed, and the recently molded pleated filter is ejected. Subsequently, the selvage take-up roll 86 operates to pull the next section of filter media 85 into the space between the open mold sections 63 and 65 for the next injection molding process.

Figure 23:
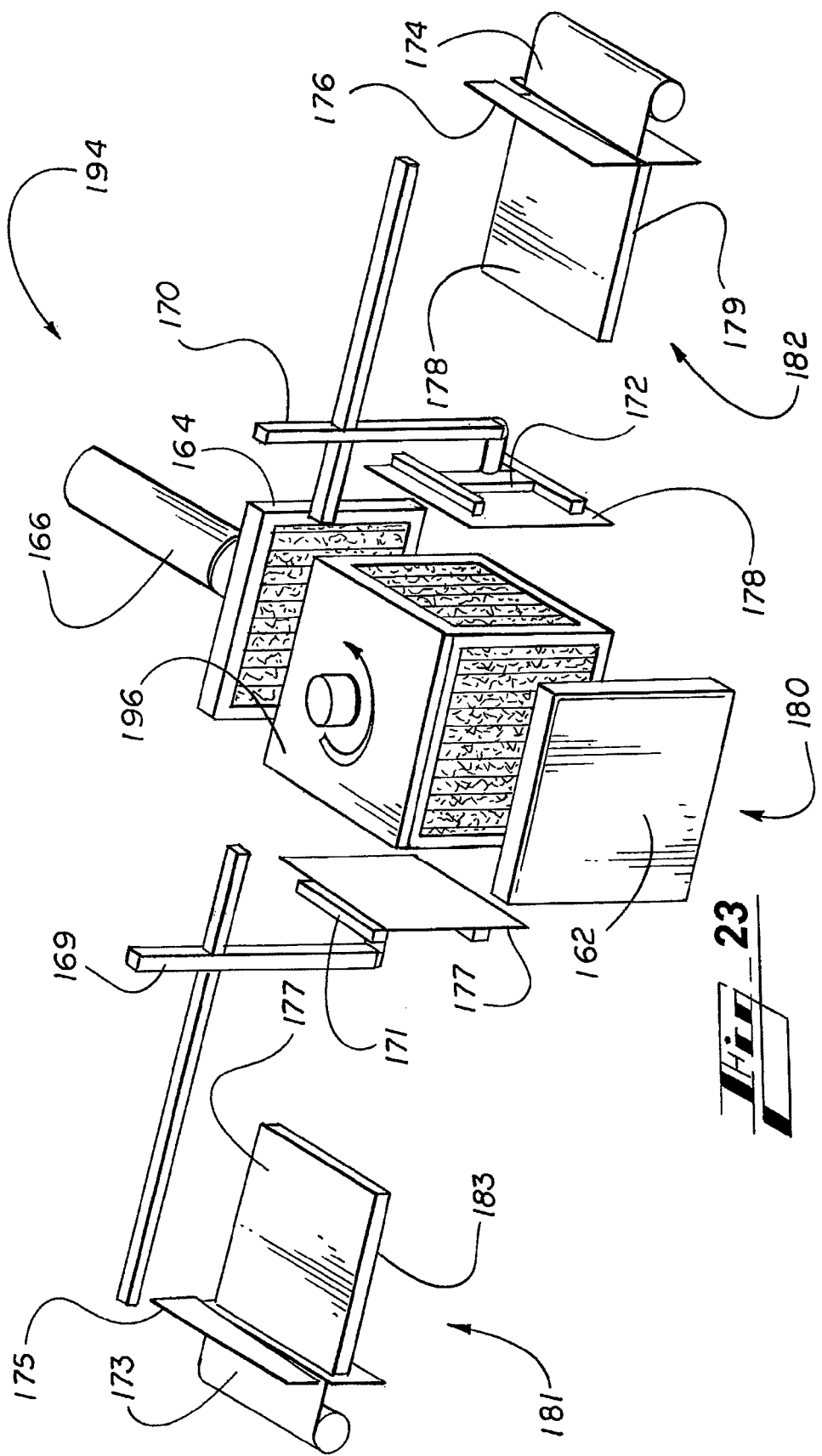

FIGS. 23-25 show an injection molding process similar to that previously described in connection with FIGS. 17-19. The injection molding process shown in FIGS. 23-25 substitutes a rotating stack mold 196 for the injection mold 60 in the injection molding process described in FIGS. 17-19. In that regard, FIGS. 23-25 show three steps in an injection molding process that are illustrative of a third method in accordance with the present invention. The injection molding process illustrated by FIGS. 23-25 is implemented by an injection molding system 194 that includes an injection molding station 180 and two filter media pickup stations 181 and 182. The molding station 180 includes the rotating mold stack 196, a half mold section 162, and a half mold section 164 with an injection unit 166 operatively connected thereto for injecting molten thermoplastic material into the rotating stack mold 196. Manifolds (not shown) may be used to direct the thermoplastic material through the rotating mold stack 196 to the half mold section 162 during the molding process. Each of the faces of the rotating mold stack 196 has a pattern that conforms to the linear pleats for the finished pleated filter 10. The half mold sections 162 and 164 have a pattern that conforms to the skeletal structure 26 of the pleated filter 10.

The media pickup stations 181 and 182 include shears 175 and 176, each of which cuts continuous webs of filter media 173 and 174 into individual filter media pieces 177 and 178. The individual filter media pieces 177 and 178 are disposed in filter media stacks 179 and 183 at the pickup stations 181 and 182, respectively. Two articulating pickup arms 169 and 170 are mounted for movement along stationary beams 167 and 168, respectively. The articulating pickup arms 169 and 170 include articulating pickup heads 171 and 172 that are capable of capturing and lifting the individual filter media pieces 177 and 178 from the stacks 179 and 183. For example, the pickup heads 171 and 172 may employ suction to capture and hold the individual filter media 177 and 178.

As shown in FIG. 23, the rotating mold stack 196 is open to receive filter media pieces 177 and 178. The articulating pickup arms 169 and 170, with the captured individual filter media pieces 177 and 178, have moved from positions adjacent the stacks 179 and 183 to positions adjacent the rotating stack mold 196. The pickup heads 171 and 172 of the articulating pickup arms 169 and 170 have repositioned the captured individual filter media pieces 177 and 178 so that captured filter media pieces 177 and 178 are in a vertical orientation prior to insertion on opposite faces of rotating stack mold 196. FIG. 24 shows the rotating stack mold 196 closed with the filter media captured between the mold sections 162 and 164 and the rotating stack mold 196 and with the filter media pieces 177 and 178 held on the open opposite faces of the rotating stack mold 196 by electrostatic charge, by protruding pins, by a vacuum, by gripping, by pinching, by wedging, by tucking, by clamping is, etc. With the mold sections 162 and 164 closed against the rotating stack mold 196, the injection unit 166 injects the thermoplastic material to form the filter frame 12 with its skeletal structure 26 in contact with the filter media pieces 177 and 178.

As shown in FIG. 25, the rotating stack mold 196 is open having just completed molding two pleated filters 10. The rotating stack mold 196 is then rotated 90° to introduce the next pair of filter media into alignment with the mold sections 162 and 164. In coordination, the articulating pickup arms 169 and 170 deliver the next pair of filter media pieces to the exposed faces of the rotating stack mold 196.

Because the processes shown in FIGS. 17-25 inject molten thermoplastic material into a cavity in which the filter media has been placed, the molten thermoplastic material in the form of the skeletal structure 26 attaches itself to the filter media to hold the filter media in its pleated configuration and to support the filter media against forces exerted by a fluid (gas or liquid) passing through the finished pleated filter 10. Alternatively, the filter frame 12 with its skeletal structure 26 may be injection molded as a separate piece, and the filter media may be later glued or welded to the skeletal structure 26 in a separate automated operation.

Turning to FIG. 26, a thermoforming process is employed to manufacture the pleated filter 10 in accordance with the present invention. The thermoforming system 500 comprises a supply roll 510 of a web of thermoplastic material 512, a die cutting station 515, a heating station 521, and a molding station 531. The web of thermoplastic material 512 is unwound from the supply roll 510 and advances into the die cutting station 515. The die cutting station 515 comprises an upper die cutter 514 and a lower die cutter 516. The upper and lower die cutters 514 and 516 have patterns, such as pattern 518, which conform to the configuration of the skeletal structure 26 of the pleated filter 10. When the die cutters 514 and 518 are brought together, areas in the plastic web of thermoplastic material 512, which ultimately conform to the open spaces in the skeletal structure 26, are removed from the web of thermoplastic material 512. With the skeletal structure 26 formed in the web 512 by the die cutting station 515, the web 512 moves to the heating station 521. Heaters 520 and 522, each with heating elements 524, soften the web of thermoplastic material 512. From the heating station 521, the web of thermoplastic material 512 moves toward the molding station 531. Prior to entering the molding station 531, a web of filter media 40 is unwound from a supply roll 526 and joined to the web of thermoplastic material 512 by means of roller 529. The laminate thus formed by the filter media 40 and the thermoplastic material 512 proceeds into the molding station 531. The molding station 531 comprises an upper mold 530 and a lower mold 532. The upper mold 530 has a three-dimensional pleated pattern 534, and the lower mold 532 has a complementary three-dimensional pleated pattern 536. Alternatively, the upper mold 530 and the lower mold 532 may have other three-dimensional undulating patterns besides pleated patterns. When the upper mold 530 and the lower mold 532 are brought together, the laminate comprising the filter media 40 and the softened thermoplastic material 512 are brought into intimate contact so that the filter media 40 bonds to the thermoplastic material 512 and the laminate is formed into the final pleated configuration of the pleated filter 10 with its integral skeletal structure 26.

Turning to FIG. 27, an extrusion process is employed to manufacture the pleated filter 10 in accordance with the present invention. The extrusion system 600 comprises a thermoplastic extruder 610 that extrudes a web of thermoplastic material 612, a pleat forming station 615, a die cutting station 619, a heating station 625, a bonding station 633, and a shearing station 636. The web of thermoplastic material 612 exits the extruder 610 and advances into the pleat forming station 615. The pleat forming station 615 comprises a pair of pleating rolls 614 and 616 with meshing teeth. As the web of thermoplastic material 612 passes through the nip between the pleating rolls 614 and 616, the teeth of the pleating rolls 614 and 616 impart a pleated configuration to the web of thermoplastic material 612. From the pleating station 615, the web of thermoplastic material 612 moves to the die cutting station 619. The die cutting station 619 comprises an upper die cutter 618 and a lower die cutter 620. The lower die cutter 620 has a pattern 622 that conforms to the configuration of the skeletal structure 26 of the pleated filter 10. The upper die cutter 618 has a matching pattern to the pattern 622 of the lower die cutter 620. When the die cutters 618 and 620 are brought together, areas in the pleated web of the thermoplastic material 612 are removed from the web of thermoplastic material 612. The areas in the pleated web that are removed ultimately conform to the open spaces in the skeletal structure 26. After the skeletal structure 26 is formed in the pleated web 612 by the die cutting station 619, the pleated web 612 moves to the heating station 625. Heaters 624 and 626, each with heating elements 628, soften the pleated web of thermoplastic material 612. From the heating station 625, the pleated web of thermoplastic material 612 moves toward the bonding station 633. Prior to entering the bonding station 633, a web of filter media 40 is unwound from a supply roll 628 and joined to the pleated web of thermoplastic material 612 by means of roller 630. The filter pleated media 40 and the thermoplastic material 612 are fed together into the bonding station 633. The bonding station 633 comprises a pair of bonding rolls 632 and 634 with meshing teeth. As the filter media 40 and the pleated web of thermoplastic material 612 pass through the nip between the bonding rolls 632 and 634, the teeth of the bonding rolls 632 and 634 bring the filter media 40 and the thermoplastic material 612 into intimate contact so that the filter media 40 bonds to the pleated web of thermoplastic material 612. The resulting bonded structure constitutes the pleated configuration of the pleated filter 10 with its integral skeletal structure 26. The bonded structure then the moves from the bonding station 633 to the shearing station 636, where each individual pleated filter 10 is separated from the successive pleated filter 10.

Turning to FIG. 28, an extrusion/needle punch process is employed to manufacture the pleated filter 10 having a single intermediate pleated band 50 in accordance with the present invention. The extrusion system 700 comprises a thermoplastic extruder 710 that extrudes a web 712 of thermoplastic material, a needle punch station 719, a molding station 721, and a shearing station 728. The web 712 of thermoplastic material that is formed by the extruder 710 includes for example raised portions 714 with thinner portions 718. The raised portion 714 corresponds to one of the pleated end bands 54 of the pleated filter 10. The extruded web 712 of thermoplastic material moves from the extruder 710 and advances into the needle punch station 719. At the needle punch station 719, the needle punch head drives a series of needles 717 into the thermoplastic material in the thinner portions 718 of the web 712 of thermoplastic material. In the thinner portion 718, the needle punch operation creates the filter media 40 for the pleated filter 10. From the needle punch station 719, the web 712 of thermoplastic material moves to the molding station 721. The molding station 721 comprises an upper mold 720 and a lower mold 722. The upper mold 720 has a three-dimensional pleated pattern 724, and the lower mold 722 has a complementary three-dimensional pleated pattern 726. When the upper mold 720 and the lower mold 722 are brought together, the web 712 of thermoplastic material is formed into the three-dimensional pleated configuration of the pleated filter 10 with its integral skeletal structure 26. The resulting pleated structure then moves from the molding station 721 to the shearing station 728, where each individual pleated filter 10 is separated from the successive pleated filter 10.

Alternatively, instead extruding the web 712 of thermoplastic material, the thermoplastic material 712 may be formed by molding prior to being needle punched at needle punch station 719.

Turning to FIG. 29, an in situ molding process is employed to manufacture the pleated filter 10 having a single intermediate pleated reinforcement band 50 in accordance with the present invention. The in situ molding system 800 comprises a supply roll 710 of thermoplastic filter media 812, a molding station 815, and a shearing station 822. The web of thermoplastic filter media 812 is in the form of a batt having a loft. From the supply roll 810, the batt of thermoplastic filter media 812 moves to the molding station 815. The molding station 815 comprises an upper mold 814 and a lower mold 816. The upper mold 814 has a three-dimensional pleated pattern 818 (or other three-dimensional pattern), and the lower mold 816 has a complementary three-dimensional pleated pattern 820 (or other complementary three-dimensional pattern). In addition, the upper mold 814 and the lower mold 816 have areas in which they can exert greater heat and pressure, particularly in those areas where the skeletal structure 26, including peak ribs, valley ribs, and reinforcement bands 50 and 54, are to be formed in the final configuration of the pleated filter 10. The greater heat and pressure in those areas cause the batt of thermoplastic filter media 812 to harden into the skeletal structure 26, including the peak ribs, the valley ribs, and the reinforcement bands 50 and 54. When the upper mold 814 and the lower mold 816 are brought together, the web of thermoplastic filter media 812 is formed into the pleated configuration of the pleated filter 10 with its integral skeletal structure 26 including the peak ribs, the valley ribs, and the reinforcement bands 50 and 54. The resulting pleated structure then moves from the molding station 815 to the shearing station 822, where each individual pleated filter 10 is separated from the successive pleated filter 10.

Turning to FIGS. 30-32, an alternative injection molding process is illustrated in which a thermoplastic material is injected into a mold to form both the filter media 40 and the skeletal structure 26 of the pleated filter 10 in a single molding process. The molding system 900 comprises a mold 960, a first injection unit 966, a second injection unit 967, a stationary half mold section 964, and a movable half mold section 962. The injection units 966 and 967 are connected to the stationary half mold section 964.

In one preferred embodiment, two different thermoplastic materials are injected into separate sections of the mold 960 to create separately the filter media 40 from one of the thermoplastic materials and to create the skeletal structure 26 from the other one of the thermoplastic materials. Particularly, with reference to FIGS. 30 and 32, the faces 957 of each of the mold sections 964 and 962 have sections 954, 952, and 930 that comprise a skeletal structure section 926. The face sections 954, 952, and 930 correspond to the to pleated end bands 54, the diagonal pleated band 52, and the peak ribs 30 of the skeletal structure 26 of the pleated filter 10, respectively. The faces 957 of each of the mold sections 964 and 962 also have a section 940 that corresponds to the filter media 40 in the pleated filter 10.

The sections 954, 952, and 930 in the faces 957 of each of the mold sections 964 and 962 are connected to the injection unit 966. The section 940 in the faces 957 of each of the mold sections 964 and 962 is connected to the injection unit 967. Consequently, the thermoplastic material injected by the injection unit 966 produces the skeletal structure 26 of the pleated filter 10, and the thermoplastic material ejected by the injection unit 967 produces the filter media 40 of the pleated filter 10. The filter media 40 is produced by a series of micro openings in the section 940 of the mold 960. The micro openings produce a series of discrete fibers or a series of continuous filaments. The thermoplastic material used to produce the filter media 40 typically would have a higher melt flow rate than the thermoplastic material used produce the skeletal structure 26.

Turning to FIG. 30, the mold 960 is an open position prior to commencement of the injection molding process. In FIG. 31, the movable half mold section 962 is closed onto stationary half mold section 964. With the mold 960 closed as shown in the FIG. 31, the injection unit 966 injects thermoplastic material into the sections 954, 952, and 930 to produce the pleated end bands 54, the diagonal pleated band 52, and the peak ribs 30 of the skeletal structure 26 of the pleated filter 10. Either sequentially or simultaneously, the injection unit 967 injects thermoplastic material into the section 940 of the mold 960 to produce the filter media 40 with its fiber or filament structure. Once the mold has cooled and the thermoplastic material has solidified, the mold 960 is opened, and the pleated filter 10 is ejected as shown in FIG. 32. While the process has been described above as using two injection units and two thermoplastic materials, the process may be carried out by using a single injection unit and a single thermoplastic material.

While this invention has been described with reference to preferred embodiments thereof, it is to be understood that variations and modifications can be affected within the spirit and scope of the invention as described herein and as described in the appended claims.

I claim:

1. A three-dimensional filter comprising:
   a. a frame comprising:
      i. a wall forming a periphery that defines a space within the periphery wherein the periphery includes a pair of opposite end walls and a pair of opposite side walls, wherein each of the end walls is a single wall comprising a solid lower planar end wall portion and solid end wall peaks that protrude from and are inwardly slanted with respect to the lower planar portion, and open notches are defined between the end wall peaks and wherein each of the side walls is a single wall comprising a lower planar side wall portion and an upper side wall planar portion inwardly slanted with respect to the lower planar side wall portion; and
      ii. a skeletal structure occupying the space within the periphery wherein the skeletal structure has peak ribs extending between the solid end wall peaks of the opposite end walls and valley ribs and extending between the solid lower planar portion of the opposite end walls, wherein the peak ribs and the valley ribs form peaks and valleys in the skeletal structure with open ends, and wherein the solid end wall peaks and the solid lower planar portion are attached to the open ends and close the open ends of the skeletal structure; and
   b. a filter media connected to the skeletal structure and conforming to the peaks and valleys of the skeletal structure and terminating at the solid end wall peaks.

2. The three-dimensional filter of claim 1, wherein the end wall peaks extend above the lower planar portion sufficiently so that a plurality of similarly constructed three-dimensional filters can be nested for stacking.

3. The three-dimensional filter of claim 1, wherein the end walls are configured to have an open position that allows the filters to be nested for stacking and a closed position that closes the ends of the peaks and valleys when the filter is in use wherein the end walls have a hinged baffle that moves from a lowered position that corresponds to the open position of the end wall to a raised position that corresponds to the closed position of the end wall.

4. The three-dimensional filter of claim 1, wherein the end walls are configured to have an open position that allows the filters to be nested for stacking and a closed position that closes the ends of the peaks and valleys when the filter is in use wherein the end walls are disconnected from the ends of the peaks and valleys when the end walls are in the open position are connected to the ends of the peaks and valleys when the end walls are in the closed position.

5. The three-dimensional filter of claim 1, wherein the end walls are configured to have an open position that allows the filters to be nested for stacking and a closed position that closes the ends of the peaks and valleys when the filter is in use wherein the end walls are hinged to end swung away from the ends of the peaks and valleys when the end walls are in the open position are fixedly connected to the ends of the peaks and valleys when the end walls are in the closed position.

6. The three-dimensional filter of claim 1, wherein the skeletal structure includes pleated reinforcing end bands positioned at the ends of the peaks and valleys, engaging the peak ribs and the valley ribs, and extending parallel to the end walls.

7. The three-dimensional filter of claim 1, wherein the skeletal structure includes reinforcing intermediate pleated bands positioned between the end walls, engaging the peak ribs and the valley ribs, and extending diagonally to the peak ribs and the valley ribs.

8. The three-dimensional filter of claim 1, wherein the skeletal structure further includes rib supports extending between the peak ribs and the valley ribs to reinforce and maintain separation between the peak ribs and the valley ribs.

9. The three-dimensional filter of claim 1, wherein the peaks and valleys of the skeletal structure extend between the end walls, wherein the peaks and valleys have ends that include a first portion of a releasable connector, wherein the end walls include a second portion of the releasable connector, and wherein the portions of the connector connect the end walls to the skeletal structure.

10. The three-dimensional filter of claim 9, wherein the skeletal structure has intermediate connector portions that are exposed when a part of the skeletal structure is removed so that the end wall can be connected to the intermediate connector portions.

11. The three-dimensional filter of claim 1, wherein the frame and the filter media are composed of the same material.

12. The three-dimensional filter of claim 11, wherein the material for the frame, the skeleton, and the filter media is selected from the group consisting of polypropylene, polyester, and polyethylene.

13. The three-dimensional filter of claim 9, wherein the first portion of the releasable connector constitute a serpentine tab and the second portion of the releasable connector constitute a matching serpentine slot.

14. The three-dimensional filter of claim 9, wherein the end walls are connected by means of a hinge to the skeletal structure.

15. A three-dimensional filter comprising:
   a. a frame comprising:
      i. a wall forming a periphery that defines a space within the periphery wherein the periphery includes a pair of opposite end walls and a pair of opposite side walls, wherein each of the end walls comprises a solid lower step portion flared outwardly and downwardly and an upper portion with solid end wall peaks protruding upwardly from the lower step portion and with open notches formed between the end wall peaks, wherein the upper portion is flared upwardly and inwardly from the lower step portion; and
      ii. a skeletal structure occupying the space within the periphery, wherein the skeletal structure has peak ribs coinciding with and extending between the solid end wall peaks of the opposite end walls and valley ribs coinciding with and extending between the solid lower step portion of the opposite end walls, wherein the peak ribs and the valley ribs form peaks and valleys in the skeletal structure with open ends, and wherein the solid end wall peaks and the solid lower step portion are attached to the open ends and close the open ends of the skeletal structure; and
   b. a filter media connected to the skeletal structure and conforming to the peaks and valleys of the skeletal structure.

16. The three-dimensional filter of claim 15, wherein the end wall peaks extend above the lower step portion sufficiently so that a plurality of similarly constructed three-dimensional filters can be nested for stacking.

17. A three-dimensional filter comprising:
   a. a frame comprising:
      i. a wall forming a periphery that defines a space within the periphery;
      ii. a skeletal structure extending into the space within the periphery and having peaks and valleys; and
   b. a filter media connected to the skeletal structure and conforming to the peaks and valleys of the skeletal structure,
   wherein the periphery includes a pair of opposite end walls and a pair of opposite side walls, wherein the peaks and valleys are pleats extending between the end walls, wherein the peaks and valleys have ends, wherein the ends of the peaks and valleys are adjacent the end walls, wherein the end walls are configured to have an open position that allows the filters to be nested for stacking and a closed position that closes the ends of the peaks and valleys when the filter is in use, and wherein the end walls have a hinged baffle that moves from a lowered position that corresponds to the open position of the end wall to a raised position that corresponds to the closed position of the end wall.

18. A three-dimensional filter comprising:
   a. a frame comprising:
      i. a wall forming a periphery that defines a space within the periphery;
      ii. a skeletal structure extending into the space within the periphery and having peaks and valleys; and
   b. a filter media connected to the skeletal structure and conforming to the peaks and valleys of the skeletal structure,
   wherein the periphery includes a pair of opposite end walls and a pair of opposite side walls, wherein the peaks and valleys are pleats extending between the end walls, wherein the peaks and valleys have ends, wherein the ends of the peaks and valleys are adjacent the end walls, wherein the end walls are configured to have an open position that allows the filters to be nested for stacking and a closed position that closes the ends of the peaks and valleys when the filter is in use, and wherein the end walls are disconnected from the ends of the peaks and valleys when the end walls are in the open position are connected to the ends of the peaks and valleys when the end walls are in the closed position.

19. A three-dimensional filter comprising:
   a. a frame comprising:
      i. a wall forming a periphery that defines a space within the periphery;
      ii. a skeletal structure extending into the space within the periphery and having peaks and valleys; and
   b. a filter media connected to the skeletal structure and conforming to the peaks and valleys of the skeletal structure,
   wherein the periphery includes a pair of opposite end walls and a pair of opposite side walls, wherein the peaks and valleys are pleats extending between the end walls, wherein the peaks and valleys have ends, wherein the ends of the peaks and valleys are adjacent the end walls, wherein the end walls are configured to have an open position that allows the filters to be nested for stacking and a closed position that closes the ends of the peaks and valleys when the filter is in use, and wherein the end walls are hinged to end swung away from the ends of the peaks and valleys when the end walls are in the open position are fixedly connected to the ends of the peaks and valleys when the end walls are in the closed position.

* * * * *